US009338183B2

(12) United States Patent
Sharpe et al.

(10) Patent No.: US 9,338,183 B2
(45) Date of Patent: *May 10, 2016

(54) SESSION HOPPING

(71) Applicant: HARRIS CORPORATION, Melbourne, FL (US)

(72) Inventors: Ryan E. Sharpe, Indialantic, FL (US); Christopher T. Dowin, Melbourne, FL (US); Ellen K. Lin, West Melbourne, FL (US); Ashley M. Kopman, Melbourne, FL (US); Wayne B. Smith, Melbourne Beach, FL (US)

(73) Assignee: Harris Corporation, Melbourne, FL (US)

( * ) Notice: Subject to any disclaimer, the term of this patent is extended or adjusted under 35 U.S.C. 154(b) by 210 days.

This patent is subject to a terminal disclaimer.

(21) Appl. No.: 14/083,032

(22) Filed: Nov. 18, 2013

(65) Prior Publication Data

US 2015/0143516 A1    May 21, 2015

(51) Int. Cl.
*H04L 29/02* (2006.01)
*H04L 29/06* (2006.01)

(52) U.S. Cl.
CPC .................................. *H04L 63/1441* (2013.01)

(58) Field of Classification Search
CPC ............ H04L 63/1441; H04L 63/1491; H04L 29/12433; H04L 29/06646; H04L 61/2539; G06F 21/6254
USPC ......................................................... 726/22
See application file for complete search history.

(56) References Cited

U.S. PATENT DOCUMENTS

| 5,278,570 A | 1/1994 | Jaramillo et al. |
| 5,734,649 A | 3/1998 | Carvey et al. |
| 6,052,064 A | 4/2000 | Budnik et al. |

(Continued)

FOREIGN PATENT DOCUMENTS

| CN | 1173256 | 2/1998 |
| JP | 2008177714 A | 7/2008 |

(Continued)

OTHER PUBLICATIONS

Search Report for Taiwan Patent Application No. 102115550 dated Oct. 20, 2014.

(Continued)

*Primary Examiner* — Ellen Tran
(74) *Attorney, Agent, or Firm* — Fox Rothschild LLP; Robert J. Sacco; Carol E. Thorstad-Forsyth

(57) ABSTRACT

Method for communicating in a computer network from a first node (101, 102, 103) in the network to a second node (136, 138), not in the network. A virtual identity is selected for the first node. The virtual identity is comprised of one or more session identity parameters used for representing the first node during a static communication session with the second node. The session identity parameters used during the static communication session are excluded from a coordinated variation of identity parameters for nodes within the network. In response to determining an occurrence of at least one communication security threat with respect to the static communication session, the method further involves adaptively modifying the virtual identity assigned to the first node by changing at least one of the session identity parameters.

20 Claims, 20 Drawing Sheets

(56) References Cited

U.S. PATENT DOCUMENTS

| | | | |
|---|---|---|---|
| 6,055,236 | A | 4/2000 | Nessett et al. |
| 6,154,839 | A | 11/2000 | Arrow et al. |
| 6,510,154 | B1 | 1/2003 | Mayes et al. |
| 6,535,511 | B1 | 3/2003 | Rao |
| 6,618,761 | B2 | 9/2003 | Munger et al. |
| 6,646,989 | B1 | 11/2003 | Khotimsky et al. |
| 6,826,684 | B1 | 11/2004 | Fink et al. |
| 6,917,974 | B1 | 7/2005 | Stytz et al. |
| 6,981,146 | B1 | 12/2005 | Sheymov |
| 7,010,604 | B1 | 3/2006 | Munger et al. |
| 7,043,633 | B1 | 5/2006 | Fink et al. |
| 7,085,267 | B2 | 8/2006 | Carey et al. |
| 7,089,303 | B2 | 8/2006 | Sheymov et al. |
| 7,116,937 | B2 | 10/2006 | Kinzler |
| 7,133,930 | B2 | 11/2006 | Munger et al. |
| 7,216,359 | B2 | 5/2007 | Katz et al. |
| 7,236,598 | B2 | 6/2007 | Sheymov et al. |
| 7,382,778 | B2 | 6/2008 | Chari et al. |
| 7,469,279 | B1 | 12/2008 | Stamler et al. |
| 7,712,130 | B2 | 5/2010 | Reamer |
| 7,739,497 | B1 | 6/2010 | Fink et al. |
| 7,756,140 | B2 | 7/2010 | Matoba |
| 7,757,272 | B1 | 7/2010 | Dean |
| 7,787,476 | B2 | 8/2010 | Shimizu et al. |
| 7,895,348 | B2 | 2/2011 | Twitchell, Jr. |
| 7,958,556 | B2 | 6/2011 | Roesch et al. |
| 7,996,894 | B1 | 8/2011 | Chen et al. |
| 8,037,530 | B1 | 10/2011 | Fink et al. |
| 8,139,504 | B2 | 3/2012 | Mankins et al. |
| 8,199,677 | B1 | 6/2012 | Amis et al. |
| 8,429,393 | B1* | 4/2013 | Anderson ............... G06F 21/73 380/273 |
| 8,464,334 | B1 | 6/2013 | Singhal |
| 8,572,717 | B2 | 10/2013 | Narayanaswamy |
| 8,769,688 | B2 | 7/2014 | Geigel |
| 8,844,036 | B2 | 9/2014 | Saidi et al. |
| 8,862,747 | B2 | 10/2014 | Shah et al. |
| 8,959,573 | B2 | 2/2015 | Smith et al. |
| 2002/0010799 | A1 | 1/2002 | Kubota et al. |
| 2002/0161884 | A1 | 10/2002 | Munger et al. |
| 2002/0161905 | A1 | 10/2002 | Haverinen et al. |
| 2003/0149783 | A1 | 8/2003 | McDaniel |
| 2004/0012531 | A1 | 1/2004 | Toda |
| 2004/0022194 | A1 | 2/2004 | Ricciulli |
| 2004/0103205 | A1 | 5/2004 | Larson et al. |
| 2004/0255167 | A1 | 12/2004 | Knight |
| 2005/0038708 | A1 | 2/2005 | Wu |
| 2005/0172155 | A1* | 8/2005 | Sheymov ............... G06Q 20/10 726/5 |
| 2005/0235044 | A1 | 10/2005 | Tazuma |
| 2006/0121418 | A1 | 6/2006 | DeMarco et al. |
| 2007/0058540 | A1 | 3/2007 | Kay |
| 2007/0073838 | A1 | 3/2007 | Shizuno |
| 2007/0081541 | A1 | 4/2007 | Umekage et al. |
| 2007/0133576 | A1 | 6/2007 | Tsuge et al. |
| 2007/0261112 | A1 | 11/2007 | Todd et al. |
| 2008/0052487 | A1 | 2/2008 | Akahane et al. |
| 2008/0056487 | A1 | 3/2008 | Akyol et al. |
| 2008/0140847 | A1 | 6/2008 | Almog |
| 2008/0159128 | A1 | 7/2008 | Shaffer et al. |
| 2008/0172739 | A1 | 7/2008 | Nakae et al. |
| 2008/0205399 | A1 | 8/2008 | Delesalle et al. |
| 2008/0222734 | A1 | 9/2008 | Redlich et al. |
| 2008/0235755 | A1 | 9/2008 | Blaisdell et al. |
| 2008/0313348 | A1 | 12/2008 | Morris et al. |
| 2009/0031042 | A1 | 1/2009 | Phatak |
| 2009/0059788 | A1 | 3/2009 | Granovsky et al. |
| 2009/0103726 | A1 | 4/2009 | Ahmed |
| 2009/0106439 | A1 | 4/2009 | Twitchell, Jr. |
| 2009/0165116 | A1 | 6/2009 | Morris |
| 2009/0265299 | A1 | 10/2009 | Hadad et al. |
| 2009/0285101 | A1 | 11/2009 | Lu |
| 2010/0009758 | A1 | 1/2010 | Twitchell, Jr. |
| 2010/0229241 | A1 | 9/2010 | Liu et al. |
| 2010/0246823 | A1 | 9/2010 | Xiao et al. |
| 2010/0274923 | A1 | 10/2010 | Dean |
| 2010/0322391 | A1 | 12/2010 | Michaelis et al. |
| 2010/0333188 | A1 | 12/2010 | Politowicz |
| 2011/0016210 | A1 | 1/2011 | Underwood |
| 2011/0103394 | A1* | 5/2011 | Vogt .................. H04L 29/12367 370/401 |
| 2011/0179136 | A1 | 7/2011 | Twitchell, Jr. |
| 2011/0277032 | A1 | 11/2011 | Vargas |
| 2012/0117376 | A1 | 5/2012 | Fink et al. |
| 2012/0201138 | A1 | 8/2012 | Yu et al. |
| 2012/0303616 | A1 | 11/2012 | Abuelsaad et al. |
| 2013/0104228 | A1 | 4/2013 | Burnham et al. |
| 2013/0298221 | A1 | 11/2013 | Smith et al. |
| 2013/0298227 | A1 | 11/2013 | Smith et al. |
| 2013/0298236 | A1 | 11/2013 | Smith et al. |

FOREIGN PATENT DOCUMENTS

| | | |
|---|---|---|
| WO | 97/13340 | 4/1997 |
| WO | 2014/008125 | 1/2014 |

OTHER PUBLICATIONS

Jian, Y. et al., "A Novel Scheme for Protecting Receiver's Location Privacy in Wireless Sensor Networks," IEEE Transactions on Wireless Communications, vol. 7, No. 10, Oct. 2008, pp. 3769-3779.

International Preliminary Report on the Patentability mailed Nov. 13, 2014, Application Serial No. PCT/US2013/0037883 in the name of Harris Corporation.

International Preliminary Report on the Patentability mailed Nov. 13, 2014 Application Serial No. PCT/US2013/037888 in the name of Harris Corporation.

International Preliminary Report on the Patentability mailed Nov. 13, 2014 Application Serial No. PCT/US2013/037894 in the name of Harris Corporation.

International Preliminary Report on the Patentability mailed Nov. 13, 2014 Application Serial No. PCT/US2013/037976 in the name of Harris Corporation.

International Preliminary Report on the Patentability mailed Nov. 13, 2014 Application Serial No. PCT/US2013/038557 in the name of Harris Corporation.

International Preliminary Report on the Patentability mailed Nov. 13, 2014 Application Serial No. PCT/US2013/038558 in the name of Harris Corporation.

International Preliminary Report on the Patentability mailed Nov. 13, 2014 Application Serial No. PCT/US2013/038600 in the name of Harris Corporation.

Boukerche et al., "Secure time synchronization protocols for wireless sensor networks," Wireless Communications, IEEE, 2007, vol. 14.5, pp. 64-69.

Wu et al., "CAR: Securing PCM Main Memory System with Cache Address Rernapping," Parallel and Distributed Systems (ICPADS), 2012 IEEE 18th International Conference, Dec. 2012, pp. 628-635.

Ganeriwal et al., Secure time synchronization service for sensor networks, 2010, ACM Digital Library, pp. 97-106.

Rajasegarar et al., Anomaly detection in wireless sensor networks, 2008, IEEE, vol. 15, Issue 4, pp. 34-40.

International Search Report mailed Mar. 3, 2014, Application Serial No. PCT/SUS2013/038557 in the name of Harris Corporation.

Repik, K.A. "Defeating Adversary Network Intelligence Efforts With Active Cyber Defense Techniques", Degree of Master of Cyber Warfare, Jun. 1, 2008, XP55004366, Retrieved from the Internet: URL:<http://www.dtic.mil/cgi-bin/GetTRDoc?A> D=ADA488411 &Location=U2&doc=GetTRDoc.pdf [retrieved on Aug. 9, 2011].

Shi, L., et al., "Full Service Hopping for Proactive Cyber-Defense", International Conference on Networking, Sensing and Control, 2008. ICNSC 2008, IEEE, Apr. 6-8, 2008.

Kewley, D., et al., "Dynamic Approach to Thwart Adversary Intelligence Gathering," pp. 176-185, 0-7695-1212—Jun. 1, 2001 IEEE.

Beraud, P., et al., "Cyber Defense Network Maneuver Commander", 978-1-4244-7402-8/10 2010 IEEE.

Levin, D., "Lessons Learned in Using Live Red Teams in IA Experiments", Retrieved from the Internet <URL:http://www.bbn.com/resources/pdf/RedTeamExptsPaper-Levin10-02.pdf>>, [retrieved on Apr. 9, 2012].

(56) References Cited

OTHER PUBLICATIONS

Michalski, John., et al., "Final Report for the Network Security Mechanisms Utilizing Network Address Translation LDRD Project (SAND2002-3613)" (Nov. 2002) Retrieved from the Internet: URL:http://prod.sandia.gov/techlib/access-control.cgi/2002/023613.pdf [retrieved on Apr. 19, 2013].

International Search Report mailed Apr. 29, 2013, Application Serial No. PCT/US2013/023702 in the name of Harris Corporation.

Atighetchi, M., et al, "Adaptive Use of Network-Centric Mechanism in Cyber-Defense", Proc. 6th IEEE International Symp. Object-Oriented Real-Time Distributed Computing, IEEE CS Press, 2003, pp. 183-192.

Information about Related Patents and Patent Applications, see section 6 of the accompanying Information Disclosure Statement Letter, which concerns Related Patents and Patent Applications.

Masking Networks, Inc. "MS-200 Network Masking Capabilities", Jun. 2010.

Zhao, C., Jia, C., & Lin, K. (Oct. 2010). Technique and Application of End-Hopping in Network Defense. In Cryptography and Network Security, Data Mining and Knowledge Discovery, E-Commerce & Its Applications and Embedded Systems (CDEE), 2010 First ACIS International Symposium on (pp. 266-270). IEEE.

U.S. Appl. No. 13/461,042, filed May 1, 2012, Systems and Methods for Dynamically Changing Networks States.

U.S. Appl. No. 13/461,022, filed May 1, 2012, Switch for Communicating Data in a Dynamic Computer Network.

U.S. Appl. No. 14/072,361, filed Nov. 5, 2013, Systems and Methods for Enterprise Mission Management of a Computer Network.

U.S. Appl. No. 14/086,431, filed Nov. 21, 2013, Systems and Methods for Deployment of Mission Plans Using Access Control Technologies.

U.S. Appl. No. 14/153,782, filed Jan. 13, 2014, Session Hopping.

U.S. Appl. No. 13/369,424, filed Feb. 9, 2012, Dynamic Computer Network With Variable Identity Parameters.

U.S. Appl. No. 13/369,433, filed Feb. 9, 2012, Mission Management for Dynamic Computer Networks.

U.S. Appl. No. 13/369,442, filed Feb. 9, 2012, Bridge for Communication With a Dynamic Computer Network.

U.S. Appl. No. 13/461,158, filed May 1, 2012, Firewalls for Filtering Communications in a Dynamic Computer Network.

U.S. Appl. No. 13/461,139, filed May 1, 2012, Router for Communicating Data in a Dynamic Computer Network.

U.S. Appl. No. 13/461,112, filed May 1, 2012, Systems and Methods for Spontaneously Configuring a Computer Network.

U.S. Appl. No. 13/461,099, filed May 1, 2012, Systems and Methods for Implementing Moving Target Technology in Legacy Hardware.

U.S. Appl. No. 13/461,069, filed May 1, 2012, Systems and Methods for Identifying, Deterring and/or Delaying Attacks to a Network Using Shadow Networking Techniques.

U.S. Appl. No. 13/461,057, filed May 1, 2012, Noise, Encryption, and Decoys for Communications in a Dynamic Computer Network.

U.S. Appl. No. 13/461,024, filed May 1, 2012, Systems and Methods for Dynamically Changing Network States.

U.S. Appl. No. 13/072,361, filed Nov. 5, 2013, Systems and Methods for Enterprise Mission Management of a Computer Network.

\* cited by examiner

| Identity Parameter | Description | Technique |
|---|---|---|
| IP Address | 32 bit number, Class C 254 Addresses | IP Header Manipulation Packet Data Manipulation |
| MAC Address | 6 Bytes - 281,474,976,710,656 Addresses First 3 Bytes - (OUI), Last 3 Bytes – NIC Specific | Ethernet Header Manipulation |
| Net/Subnet | Class A, B, or C Addresses | |
| TCP Sequence # | Make TCP Sequence numbers random. | Cross Stream Fragmentation |
| Port | 1 - 65,535 (ex. 2957) | TCP Header Manipulation |
| | | TCP Header Manipulation |

FIG. 20

SESSION HOPPING

BACKGROUND OF THE INVENTION

1. Statement of the Technical Field

The inventive arrangements relate to computer network security, and more particularly to systems for communicating between two or more logical subdivisions of a computer network where the network is dynamically maneuverable to defend against malicious attacks.

2. Description of the Related Art

The central weakness of current cyber infrastructure is its static nature. Assets receive permanent or infrequently-changing identifications, allowing adversaries nearly unlimited time to probe networks, map and exploit vulnerabilities. Additionally, data traveling between these fixed entities can be captured and attributed. The current approach to cyber security places technologies such as firewalls and intrusion detection systems around fixed assets, and uses encryption to protect data en route. However, this traditional approach is fundamentally flawed because it provides a fixed target for attackers. In today's globally connected communications infrastructure, static networks are vulnerable networks.

The Defense Advanced Research Projects Agency ("DARPA") Information Assurance ("IA") Program has performed initial research in the area of dynamic network defense. A technique was developed under the IA program to dynamically reassign Internet protocol ("IP") address space feeding into a pre-designated network enclave for the purpose of confusing any would-be adversaries observing the network. This technique is called DYnamic Network Address Transformation ("DYNAT"). An overview of the DYNAT technology was presented in a paper by DARPA entitled "Dynamic Approaches to Thwart Adversary Intelligence" which was published in 2001.

SUMMARY OF THE INVENTION

Embodiments of the invention concern a method for communicating in a computer network. The method involves maneuvering the computer network in accordance with a mission plan. The mission plan specifies a coordinated variation of assigned values for one or more identity parameters which are respectively specified for referencing each of the nodes when communicating among such nodes within the computer network. The method further involves initiating a communication from a first one of the nodes in the computer network to a second node which is not participating in the coordinated variation. A virtual identity is selected for the first node. The virtual identity is comprised of one or more session identity parameters to be used for the first node during a static communication session with the second node. The session identity parameters used during the static communication session are excluded from the coordinated variation of identity parameters described herein. In response to determining an occurrence of at least one communication security threat with respect to the static communication session, the method further involves adaptively modifying the virtual identity assigned to the first node by changing at least one of the session identity parameters.

The invention also concerns a computer system. The computer system includes a computer network which maneuvers in accordance with a mission plan as described above. At least a first node of the network is configured to initiate a communication with a second node which is not participating in the coordinated variation of identity parameters. At least one computer processing device is provided which is configured to perform the coordinated variation of assigned value. The computer processing device will also select for the first node a virtual identity comprising one or more session identity parameters to be used for referencing the first node during a static communication session with the second node. Further, the computer processing device is configured to exclude the session identity parameters from the coordinated variation during the static communication session. In response to determining an occurrence of at least one communication security threat with respect to the static communication session, the computer processing device is arranged to adaptively modify the virtual identity assigned to the first node by changing at least one of the session identity parameters.

BRIEF DESCRIPTION OF THE DRAWINGS

Embodiments will be described with reference to the following drawing figures, in which like numerals represent like items throughout the figures, and in which:

FIG. 20 is a table that is useful for understanding some of the types of identity parameters that can be modified.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

It should also be appreciated that the terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising." Further, unless otherwise defined, all terms (including technical and scientific terms) used herein have the same meaning as commonly understood by one of ordinary skill in the art to which this invention belongs.

Dynamic Session Hopping

Figure 1:
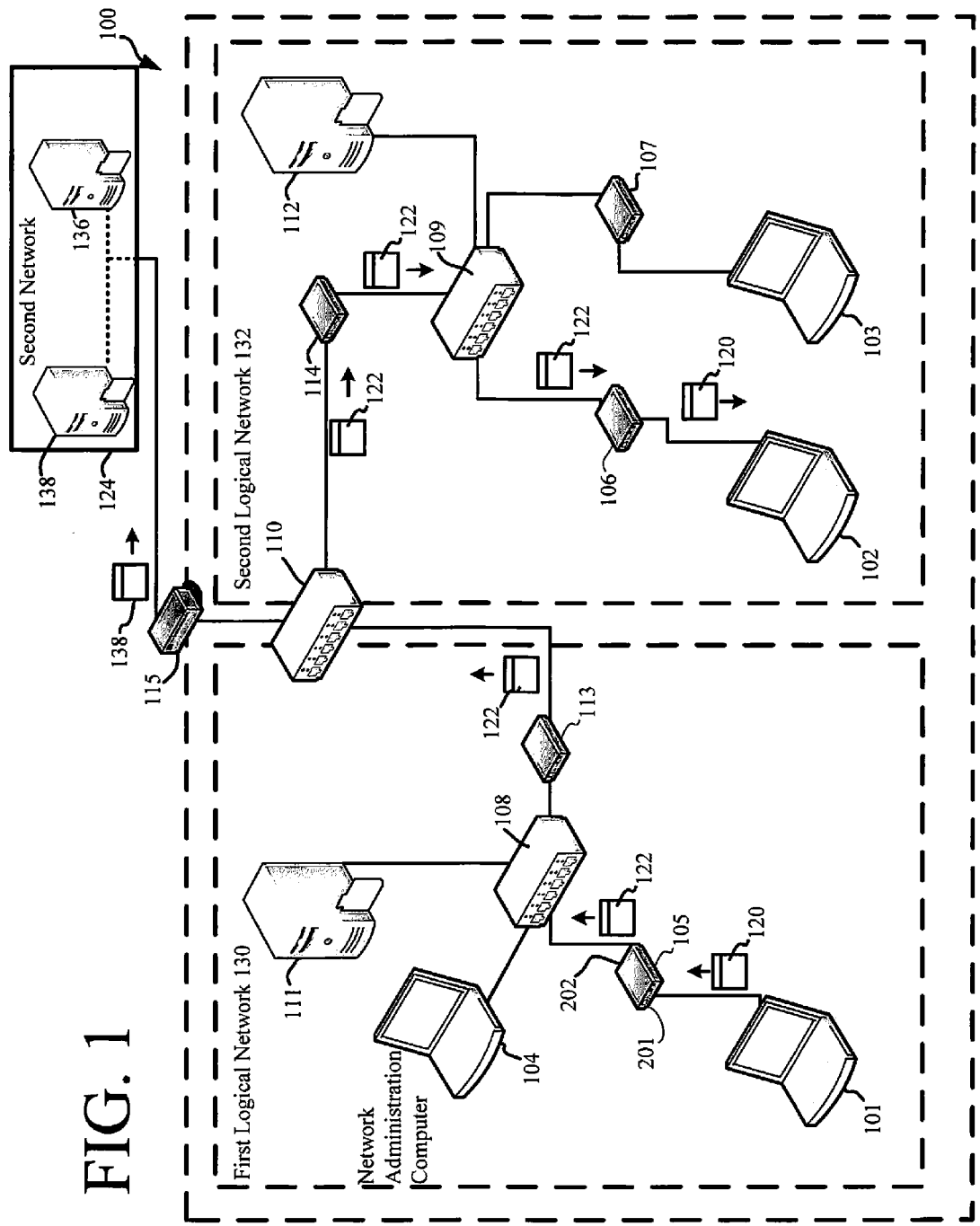
FIG. 1 is an example of a computer network that is useful for understanding the present invention.

Referring now to FIG. 1, there is shown a diagram of an exemplary computer network 100 which includes a plurality of computing devices. The computing devices include client computers 101-103, NAC 104, servers 111, 112, network layer 2 switches 108, 109, layer 3 switch 110, and a bridge 115. The client computers 101-103 can be any type of computing device which might require network services, such as a conventional tablet, notebook, laptop or desktop computer. The layer 3 switch 110 can be a conventional routing device that routes data packets between computer networks. The layer 2 switches 108, 109 are conventional hub devices (e.g., an Ethernet hub) as are well known in the art. Servers 111, 112 can provide various computing services utilized by client computers 101-103. For example, the servers 111, 112 can be file servers which provide a location for shared storage of computer files used by client computers 101-103.

The communication media for the computer network 100 can be wired, wireless or both, but shall be described herein as a wired network for simplicity and to avoid obscuring the invention. The network will communicate data using a communication protocol. As is well known in the art, the communication protocol defines the formats and rules used for communicating data throughout the network. The computer network 100 in FIG. 1 can use any communication protocol or combination of protocols which is now known or known in the future. For example, the computer network 100 can use the well-known Ethernet protocol suite for such communications. Alternatively, the computer network 100 can make use of other protocols, such as the protocols of an internet protocol suite (often referred to as the TCP/IP suite), Synchronous Optical NETwork/Synchronous Digital Hierarchy ("SONET/SDH") based protocols, or Asynchronous Transfer Mode ("ATM") communication protocols. In some embodiments, one or more of these communication protocols can be used in combination. Although one network topology is shown in FIG. 1, the invention is not limited in this regard. Instead, any type of suitable network topology can be used, such as a bus network, a star network, a ring network or a mesh network.

In a dynamic computer network (e.g., in computer network 100), data is communicated from a first computing device to a second computing device. However, one aspect of a dynamic computer network is that computing devices within the network are represented with multiple identity parameters which vary in a coordinated way over time. The coordinated variation can be defined by a mission plan. The phrase "identity parameters", as used herein, can include items such as an IP address, a Media Access Control ("MAC") address, a port number and so on. However, the identity parameters can also include a variety of other information which is useful for characterizing a network node. The various types of identity parameters contemplated herein are discussed below in further detail. Nodes that are participating in a dynamic network as described herein may sometimes be referred to as dynamic nodes or participating nodes. Processing modules (which may be provided internal or external of the dynamic nodes) facilitate participation of dynamic nodes in the dynamic computer network.

A dynamic computer network as described herein is sometimes referred to as a maneuvering network, identity agile network, or as a network which utilizes moving target technology (MTT). The network is referenced in this way because the use of multiple identity parameters that vary over time gives the network the appearance of being constantly changing. This dynamic aspect of the network makes it more difficult for adversaries to understand and attack. Still, a problem with a dynamic network as described herein arises when it is necessary for a participating node of the network to communicate with nodes that are not arranged to participate in the dynamic maneuvering (i.e., such nodes are sometimes referred to herein as static nodes or non-participating nodes). A static node is one which is not arranged to permit participation in the dynamic maneuvering. Such static nodes generally will generally lack processing modules suitable to permit participation of such nodes in a dynamic computer network.

Dynamic variation of the identity parameters referencing a dynamic node will often result in difficulties when attempting to communicate with a static or non-participating node. For example, the dynamic variation of identity parameters may cause transmitted packets to be rejected by a security appliance (e.g. a firewall) associated with a static node which is the recipient of such packets. Other problems may also occur when the dynamic node changes identity parameters. For example, the static node may not recognize subsequent communications as originating from the same dynamic computer node if identity parameters for that node are changed during a communication session. Also, the static node may attempt to transmit data packets to the dynamic node using obsolete identity parameter information, leading to misdirected data traffic.

Accordingly, one aspect of the present invention involves systems and techniques which allow a node that is participating in a maneuvering network communication session (i.e., a dynamic node) to also communicate with nodes that are not participating in the maneuvering session. A first node among a plurality of dynamic nodes forming a maneuvering computer network can initiate a communication session with a second node which is a static node. A virtual identity is selected for the first node for the communication session with the static node. A virtual identity as referred to herein comprises one or more session identity parameters to be used by the first node during the communication session with the second node. A static communication session is one in which a fixed set of session identity parameters are used to refer to the first node for communications with a non-participating node (static node). During the static communication session, the session identity parameters for an otherwise dynamic node do not vary according to the normal coordinated variations for the network as a whole. Accordingly, the virtual identity of the first node is invariant when represented to the second node (static node) during the static communication session. The virtual identity of the first node can be determined or specified at least partially based on information specified by the mission plan.

The imposition of a static virtual identity for a dynamic node which is otherwise participating in a maneuvering network facilitates communications with static nodes which are non-participants in such a network. However, the adoption of a static identity also carries some security risks as it presents a static target upon which adversaries can mount an attack. Accordingly, the first node is advantageously configured so that it will have available to it information concerning potential communication security threats with respect to the static communication session. This information can be obtained by actively monitoring network communications using threat identification algorithms, or by other means. Such monitoring can allow the first node to determine activities or occurrences on the network which are indicative of a communication security threat potentially affecting the static communication session.

In response to determining that there has been at least one occurrence of such threat activities, the first node is advantageously configured so that it will adaptively modify the virtual identity selected for it by changing at least one of the session identity parameters. Thereafter, its communications with the second node will continue but with a new or different virtual identity so as to thwart the potential threat. More particularly, the existing communication session with the static node will be terminated and a second static communication session will be initiated with the second node using a second virtual identity.

The second virtual identity will have at least one session identity parameter which is different as compared to the identity parameters used for the previous virtual identity. Notably, this adaptive modification of the virtual identity for the first node can be performed asynchronously relative to the coordinated variation of identity parameters within the dynamic network. Accordingly, the variation in virtual identity will occur independently relative to the coordinated variation of the maneuvering network as a whole, as specified by a mission plan.

During or concurrent with the static communication session as described herein, the dynamic first node can also communicate with at least one of the dynamic nodes in the maneuvering computer network. As such, the first node can concurrently participate in a static node communication session using a selected virtual identity, and a dynamic communication session in which communications are performed using one or more of the identity parameters which change in accordance with the coordinated variation defined by the mission plan. Notably, the coordinated variation described herein can result in a dynamic modification of the one or more identity parameters for nodes in the maneuvering network while the virtual identity of the first node is maintained substantially invariant. When a security threat is detected with respect to the static communication session, the virtual identity can be changed independently of the coordinated variation specified by a mission plan. Absent the occurrence of such a detected threat, the static communication session can continue while using the same virtual identity. It will be appreciated that the coordinated variation of identity parameters can result in a dynamic modification of the one or more identity parameters of the first node (for communicating with the maneuvering network) while the virtual identity of the first node is maintained invariant for communications with the node that is not participating in the maneuvering. The details of a maneuvering network as described herein will now be described in further detail.

Maneuvering Computer Network

The manipulation of identity parameters as described herein is generally performed in conjunction with data communications in the computer network 100, i.e., when data is to be communicated from a first computer in the network (e.g., client computer 101) to a second computer in the network (e.g., client computer 102). Accordingly, the identity parameters that are manipulated can include those of a source computing device (i.e., the device from which the data originated) and the destination computing device (i.e., the device to which the data is being sent). The set of identity parameters that is communicated is referred to herein as an IDentity Parameter ("IDP") set. This concept is illustrated in FIG. 1, which shows that an IDP set 120 is transmitted by client computer 101 as part of a data packet (not shown).

MTT involves selectively modifying at a first location within the computer network 100, values contained in a data packet or datagram which specify one or more identify parameters of a source computing device and/or a destination computing device. For example, the identity parameters can be modified in accordance with a mission plan. The location where such modification is performed will generally coincide with the location of one module 105-107, 113, 114 of the computer network 100. Referring once again to FIG. 1, it can be observed that the modules 105-107, 113, 114 are interposed in the computer network 100 between the various computing devices which comprise nodes in such network. In these locations, the modules 105-107, 113, 114 intercept data packet communications, perform the necessary manipulations of identity parameters, and retransmit the data packets along a transmission path. In alternative embodiments, the modules 105-107, 113, 114 can perform a similar function, but can be integrated directly into one or more of the computing devices. For example, the modules could be integrated into client computers 101, 102, 103, servers 111, 112, layer 2 switches 108, 109 and/or layer 3 switch 110. In this scenario, the modules can comprise hardware that is added to the computing and/or software that is installed on the computing device 101-103, 108-112. In some software embodiments, the modules are implemented as kernel mode software (e.g., as device drivers) that modifies the identity parameters.

Additionally, the computer network 100 can be divided into a number of logical subdivisions, sometimes referred to as sub-networks or subnets, connected through layer 3 switch 110. An enterprise network can be divided into a number of subnets for a variety of administrative or technical reasons including, but not limited to, hiding the topology of the network from being visible to external hosts, connecting networks utilizing different network protocols, separately administering network addressing schemes on the subnet level, enabling management of data traffic across subnets due to constrained data connections, and the like. Sub-netting is well known in the art and will not be described in further detail.

Referring again to FIG. 1, the exemplary computer network 100 may be divided into two logical networks, namely a first logical network 130 and a second logical network 132. The phrase "logical network", as used herein, refers to any logical subdivision of a computer network. In an embodiment, logical networks 130, 132 are connected through layer 3 switch 110. Layer 3 switch 110 is responsible for directing traffic between the logical networks, i.e., from client computer 101 to client computer 103. Layer 3 switch 110 is also responsible for directing traffic from any host connected to the computer network 100 bound for a second network 124. In the embodiment shown in FIG. 1, traffic routed from the computer network 100 to the second network 124 passes through bridge 115. As with the modules above, the functionality of the bridge 115 could be integrated within layer 3 switch 110.

Figure 2:
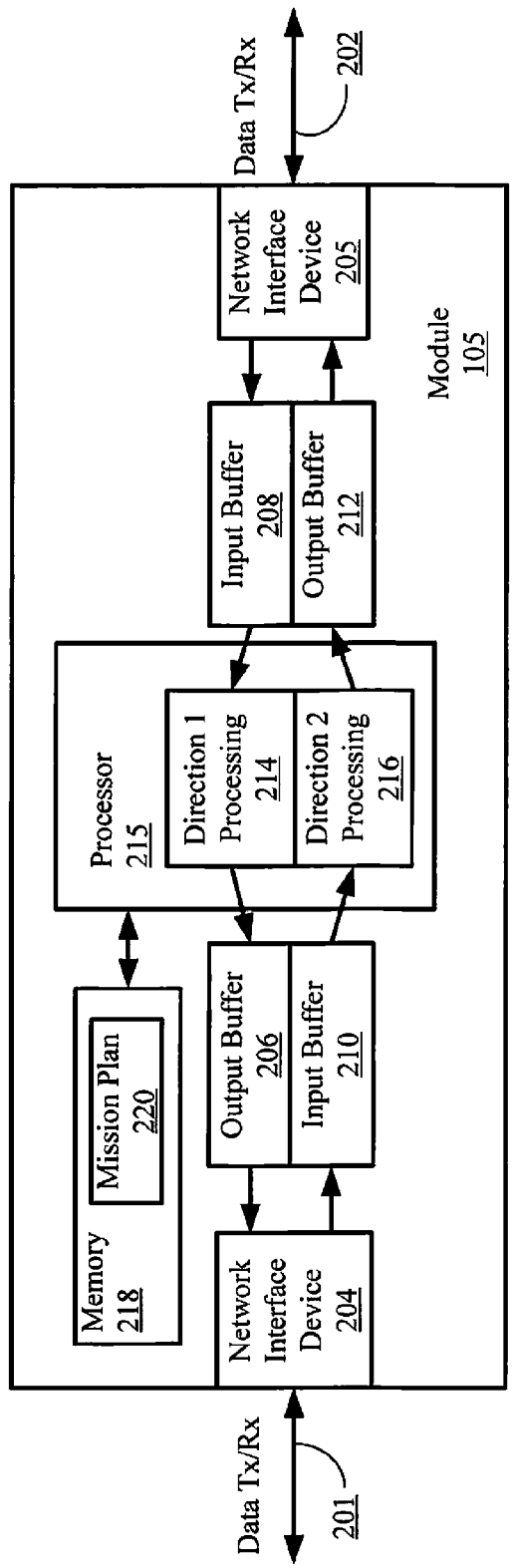
FIG. 2 is an example of a module that can be used in the present invention for performing certain manipulations of identity parameters.

An example of a functional block diagram of a module 105 is shown in FIG. 2. Modules 106, 107, 113, 114 of FIG. 1 can have a similar functional block diagram as that shown in FIG. 2, but it should be understood that the invention is not limited in this regard. As shown in FIG. 2, the module 105 has at least two data ports 201, 202, each of which can correspond to a respective network interface device 204, 205. Data received at data port 201 is processed at network interface device 204 and temporarily stored at an input buffer 210. The processor 215 accesses the input data packets contained in input buffer 210 and performs any necessary manipulation of identity parameters as described herein. The modified data packets are passed to output buffer 212 and subsequently transmitted from data port 202 using network interface device 205. Similarly, data received at data port 202 is processed at network interface device 205 and temporarily stored at an input buffer 208. The processor 215 accesses the input data packets contained in input buffer 208 and performs any necessary manipulation of identity parameters as described herein. The modified data packets are passed to an output buffer 206 and subsequently transmitted from data port 201 using network interface device 204. In module 105, manipulation of identity parameters is performed by processor 215 in accordance with a mission plan 220 stored in a memory 218.

It will be understood from FIG. 2 that the module 105 is preferably configured so that it operates bi-directionally. In such embodiments, the module 105 can implement different modification functions, depending on a source of a particular data packet. The dynamic modification function in the module 105 can be specified in the mission plan in accordance with a source computing device of a particular data packet. The module 105 can determine a source of data packets by any suitable means. For example, a source address of a data packet can be used for this purpose.

During operation, the processor 215 will determine one or more false identity parameter values that are to be used in place of the true identity parameter values. The processor 215 will transform one or more true identity parameter values to one or more false identity parameter values which are preferably specified by a pseudorandom function. Following this transformation, the module 105 will forward the modified packet or datagram to the next node of the computer network 100 along a transmission path. At subsequent points in the communication path, an adversary who is monitoring such network communications will observe false or incorrect information about the identity of computing devices communicating on the computer network 100. According to one aspect of the invention, identity parameters for a plurality of nodes comprising the network 100 are modified concurrently in a coordinated variation of the network 100. For example, identity parameters for all of the nodes in computer network 100 can be modified at the same time in response to a trigger event. Alternatively, the identity parameters for all of the nodes within a particular subnet can be selectively modified at the same time in response to a trigger event. In either scenario, the coordinated variation of identity parameters will occur in accordance with rules defined by a mission plan.

Identity parameter values will have a predetermined format that is defined by a communication protocol. For example, an IP address and a MAC address will each have a known predetermined format. Since it is a desirable that an attacker be unable to discern true identity parameters from false identity parameters, the false identity parameter values should have the same format as the true identity parameters. In other words, a false identity parameter should have all of the correct characteristics and formatting which are normally specified for that type of identity parameter when using a particular network communication protocol. For purposes of the present invention, it is anticipated that identity parameters may be transmitted in the clear (i.e. the information will not be encrypted). By maintaining the correct format for both true and false identity parameters included in transmitted data packets, the system ensures that an adversary observing network traffic cannot effectively determine whether transmitted identity parameter values are actually true or false.

In a preferred embodiment, the false identity parameters that are specified by the pseudorandom function are varied in accordance with the occurrence of at least one proactive trigger event or at least one reactive trigger event. A proactive/reactive trigger event causes the processor 215 to use the pseudorandom function to generate a new set of false identity parameter values into which the true identity parameters are transformed. Accordingly, the proactive/reactive trigger event serves as a basis for the dynamic variation of the false identity parameters described herein. Proactive and reactive trigger events are discussed in more detail below. However, it should be noted that proactive/reactive trigger events for selecting a new set of false values for identity parameters can be based on at least one pre-defined rule. The rule comprises a statement that defines at least one proactive or reactive trigger event. In this regard, the user rule may implement a proactive triggering scheme or a reactive triggering scheme. A proactive triggering scheme comprises a time based scheme. A reactive triggering scheme comprises a user activation based scheme, a packet inspection based scheme, congestion level based scheme, a heuristic algorithm based scheme and/or a Network-Based Attack ("NBA") analysis based scheme. Each of the listed schemes will be described in detail below.

The transformation of identity parameters described above provides one way to maneuver a computer network 100 for purposes of thwarting a cyber-attack. In a preferred embodiment, the mission plan 220 implemented by processor 215 will also control certain other aspects of the manner in which computer network 100 can maneuver. For example, the mission plan 220 can specify that a dynamic selection of identity parameters is manipulated. The dynamic selection can include a choice of which identity parameters are selected for modification, and/or a number of such identity parameters that are selected. This variable selection process provides an added dimension of uncertainty or variation which can be used to further thwart an adversary's effort to infiltrate or learn about a computer network 100. As an example of this technique, consider that during a first time period, the module 105 can modify a destination IP address and a destination MAC address of each data packet. During a second time period, the module 105 could manipulate the source IP address and a source host name in each data packet. During a third period of time, the module 105 could manipulate a source port number and a source user name. Changes in the selection of identity parameters can occur synchronously (i.e., all selected identity parameters are changed at the same time). Alternatively, changes in the selection of identity parameters can occur asynchronously (i.e., the group of selected identity parameters changes incrementally as individual identity parameters are added or removed from the group of selected identity parameters).

A pseudorandom function is preferably used for determining the selection of identity values that are to be manipulated or transformed into false values. In other words, the module 105 will transform only the identity parameters selected by the pseudo-random function. In a preferred embodiment, the selection of identity parameters that are specified by the pseudorandom function is varied in accordance with the occurrence of a proactive/reactive trigger event. The proactive/reactive trigger event causes processor 215 to use a pseudorandom function to generate a new selection of identity parameters which are to be transformed into false identity parameters. Accordingly, the proactive/reactive trigger event serves as a basis for the dynamic variation of the selection of identity parameters described herein. Notably, the values of the identity parameters can also be varied in accordance with a pseudorandom algorithm.

The module 105 is advantageously capable of also providing a third method of maneuvering the computer network for purposes of thwarting a cyber attack. Specifically, the mission plan 220 loaded in module 105 can dynamically vary the location within the network where the modification or transformation of the identity parameters takes place. Consider that modification of identity parameters in an IDP set 120 sent from client computer 101 to client computer 102 could occur in module 105. This condition is shown in FIG. 1, where the identity parameters contained in IDP set 120 are manipulated in module 105 so that the IDP set 120 is transformed to a new or modified IDP set 122. At least some of the identity parameters in the IDP set 122 are different as compared to the identity parameters in the IDP set 120. But, the location where such transformation occurs is preferably also controlled by the mission plan. Accordingly, manipulation of the IDP set 120 could, for example, sometimes occur at module 113 or 114 of FIG. 1, instead of at module 105. This ability to selectively vary the location where manipulation of identity parameters occurs adds a further important dimension to the maneuvering capability of the computer network 100.

The dynamic variation in the location where identity parameters are modified is facilitated by selectively controlling an operating state of each module 105-107, 113, 114 of FIG. 1. To that end, the operational states of each module 105-107, 113, 114 of FIG. 1 preferably includes (1) an active state in which data is processed in accordance with a current mission plan, and (2) a by-pass state in which packets can flow through the module as if the module was not present. The location where the dynamic modification is performed is controlled by selectively causing certain modules of the computer network 100 to be in an active state and certain modules of the computer network 100 to be in a standby state. The location can be dynamically changed by dynamically varying the current state of the modules 105-107, 113, 114 of FIG. 1 in a coordinated manner.

The mission plan 220 can include a predefined sequence for determining the locations within the computer network 100 where the identity parameters are to be manipulated. Locations where identity parameters are to be manipulated will change in accordance with the predefined sequence at times indicated by a proactive/reactive trigger event. For example, the proactive/reactive trigger event can cause a transition to a new location for manipulation or transformation of identity parameters as described herein. Accordingly, the proactive/reactive trigger event serves as a basis for the occurrence of a change in the location where identity parameters are modified, and the predefined sequence determines where the new location will be.

From the foregoing, it will be appreciated that a data packet is modified at a module 105-107, 113, 114 of FIG. 1 to include false identity parameters. At some point within the computer network 100, it is necessary to restore the identity parameters to their true values, so that the identity parameters can be used to properly perform their intended function in accordance with the particular network protocol. Accordingly, the inventive arrangements also includes dynamically modifying, at a second location (i.e., a second module), the assigned values for the identity parameters in accordance with the mission plan 220. The modification at the second location essentially comprises an inverse of a process used at the first location to modify the identity parameters. The module at the second location can thus restore or transform the false value identity parameters back to their true values. In order to accomplish this action, the module at the second location must be able to determine at least (1) a selection of identity parameter value that are to be transformed, and (2) a correct transformation of the selected identity parameters from false values to true values. In effect, this process involves an inverse of the pseudorandom process or processes used to determine the identity parameter selection and the changes effected to such identity parameter values. The inverse transformation step is illustrated in FIG. 1, where the IDP set 122 is received at module 106, and the identity parameter values in IDP set 122 are transformed or manipulated back to their original or true values. In this scenario, module 106 converts the identity parameters values back to those of IDP set 120.

Notably, a module must have some way of determining the proper transformation or manipulation to apply to each data communication it receives. In a preferred embodiment, this determination is performed by examining at least a source address identity parameter contained within the received data communication. For example, the source address identity parameter can include an IP address of a source computing device. Once the true identity of the source computing device is known, the module consults the mission plan (or information derived from the mission plan) to determine what actions it needs to take. For example, these actions could include converting certain true identity parameter values to false identity parameter values. Alternatively, these changes could include converting false identity parameter values back to true identity parameter values.

Notably, there will be instances where the source address identity parameter information contained in a received data communication has been changed to a false value. In those circumstances, the module receiving the data communication will not immediately be able to determine the identity of the source of the data communication. However, the module which received the communication can in such instances still identify the source computing device. This is accomplished at the receiving module by comparing the false source address identity parameter value to a Look-Up-Table ("LUT") which lists all such false source address identity parameter values in use during a particular time. The LUT also includes a list of true source address identity parameter values that correspond to the false source address values. The LUT can be provided directly by the mission plan 220 or can be generated by information contained within the mission plan 220. In either case, the identification of a true source address identity parameter value can be easily determined from the LUT. Once the true source address identity parameter has been determined, then the module which received the data communication can use this information to determine (based on the mission plan) what manipulations to the identity parameters are needed.

Notably, the mission plan 220 can also specify a variation in the second location where identity parameters are restored to their true values. For example, assume that the identity parameters are dynamically modified at a first location comprising module 105. The mission plan can specify that the restoration of the identity parameters to their true values occurs at module 106 as described, but can alternatively specify that dynamic modification occur instead at module 113 or 114. In some embodiments, the location where such manipulations occur is dynamically determined by the mission plan in accordance with a predefined sequence. The predefined sequence can determine the sequence of locations or modules where the manipulation of identity parameters will occur.

The transition involving dynamic modification at different locations preferably occurs in accordance with a proactive/reactive trigger event. Accordingly, the predefined sequence determines the pattern or sequence of locations where data manipulations will occur, and the proactive/reactive trigger event serves as a basis for causing the transition from one location to the next. Proactive/reactive trigger events are discussed in more detail below; however, it should be noted that proactive/reactive trigger events can be based on at least one pre-defined rule. The rule comprises a statement that defines at least one proactive/reactive trigger event. In this regard, the rule may implement proactive triggering schemes or reactive triggering schemes. A proactive triggering scheme comprises a time based scheme. A reactive triggering scheme comprises a user activation based scheme, a packet inspection based scheme, a congestion level based scheme, a heuristic algorithm based scheme and/or an NBA analysis based scheme. Each of the listed schemes will be described below in detail. Control over the choice of a second location (i.e., where identity parameters are returned to their true values) can be effected in the same manner as described above with regard to the first location. Specifically, operating states of two or more modules can be toggled between an active state and a bypass state. Manipulation of identity parameters will only occur in the module which has an active operating state. The module with a bypass operating state will simply pass data packets without modification.

Alternative methods can also be used for controlling the location where manipulation of identity parameters will occur. For example, a network administrator can define in a mission plan several possible modules where identity parameters can be converted from true values to false values. Upon the occurrence of a proactive/reactive trigger event, a new location can be selected from among the several modules by using a pseudorandom function, and using a trigger time as a seed value for the pseudorandom function. If each module implements the same pseudorandom function using the same initial seed values then each module will calculate the same pseudorandom value. The trigger time can be determined based on a clock time, such as a GPS time or system clock time). In this way, each module can independently determine whether it is currently an active location where manipulation of identity parameters should occur. Similarly, the network administrator can define in a mission plan several possible modules where dynamic manipulation returns the identity parameters to their correct or true values. The selection of which module is used for this purpose can also be determined in accordance with a trigger time and a pseudorandom function as described herein. Other methods are also possible for determining the location or module where identity parameter manipulations are to occur. Accordingly, the invention is not intended to be limited to the particular methods described herein.

Notably, varying the position of the first and/or second locations where identity functions are manipulated will often result in varying a physical distance between the first and second location along a network communication path. The distance between the first and second locations is referred to herein as a distance vector. The distance vector can be an actual physical distance along a communication path between the first and second location. However, it is useful to think of the distance vector as representing the number of network nodes that are present in a communication path between the first and second locations. It will be appreciated that dynamically choosing different positions for the first and second locations within the network can have the effect of changing the number of nodes between the first and second locations. For example, in FIG. 1, the dynamic modification of identity parameters are implemented in selected ones of the modules 105, 106, 107, 113, 114. The modules actually used to respectively implement the dynamic modification are determined as previously described. If module 105 is used for converting identity parameters to false values and module 106 is used to convert them back to true values, then there are three network nodes (108, 110, 109) between modules 105 and 106. But if module 113 is used to convert to false values and module 114 is used to convert the identity parameters back to true values, then there is only one network node 110 between modules 113 and 114. Accordingly, it will be appreciated that dynamically changing the position of locations where dynamic modification occurs can dynamically vary the distance vector. This variation of the distance vector provides an added dimension of variability to network maneuvering or modification as described herein.

In the present invention, the manipulation of identity parameter values, the selection of identity parameters, and the locations where these identity parameters is each defined as a maneuvering parameter. Any time one of these three maneuvering parameters is changed, we can say that a network maneuver has occurred. In order to most effectively thwart an adversary's efforts to infiltrate a computer network 100, network maneuvering is preferably controlled by means of a pseudorandom process as previously described. Those skilled in the art will appreciate that a chaotic process can also be used for performing this function. Chaotic processes are technically different as compared to pseudorandom functions, but for purposes of the present invention, either can be used, and the two are considered equivalent. In some embodiments, the same pseudorandom process can be used for dynamically varying two or more of the maneuvering parameters. However, in a preferred embodiment of the invention, two or more different pseudorandom processes are used so that two or more of these maneuvering parameters are modified independently of the others.

Proactive and Reactive Trigger Events

As noted above, the dynamic changes to each of the maneuvering parameters is controlled by at least one proactive trigger or reactive trigger. A proactive trigger is a pre-defined event that causes a change to occur in relation to the dynamic modifications described herein. In contrast, a reactive trigger is a purely spontaneous or user initiated event that causes a change to occur in relation to the dynamic modifications described herein. Stated differently, it can be said that the proactive or reactive trigger causes the network to maneuver in a new way that is different than at a previous time (i.e., before the occurrence of the proactive or reactive trigger). For example, during a first period of time, a mission plan or security model can cause an IP address to be changed from value A to value B; but after the proactive/reactive trigger event, the IP address can instead be changed from value A to value C. Similarly, during a first period of time a mission plan or security model can cause an IP address and a MAC address to be modified; but after the proactive/reactive trigger event, the mission plan or security model can instead cause a MAC address and a user name to be modified.

In its simplest form a proactive trigger event can be based on a time based scheme. In a time based scheme, a clock time in each module could serve as a trigger. For example, a trigger event could be defined as occurring at the expiration of every N (e.g., sixty) second time interval. For such an arrangement, one or more of the maneuvering parameters could change every N seconds in accordance with a predetermined clock time. In some embodiments, all of the maneuvering parameters can change concurrently so that the changes are synchronized. In a slightly more complex embodiment, a time-based trigger arrangement can also be used, but a different unique trigger time interval can be selected for each maneuvering parameter. Thus, false identity parameter values could be changed at time interval X, a selection of identity parameters would change in accordance with a time interval Y, and a location where such changes are performed would occur at time interval Z, where X, Y and Z are different values.

It will be appreciated that in embodiments of the invention which rely upon clock time as a trigger mechanism, it is advantageous to provide synchronization as between the clocks in various modules 105, 106, 107, 113, 114 to ensure that packets are not lost or dropped due to unrecognized identity parameters. Synchronization methods are well known and any suitable synchronization mechanism can be used for this purpose. For example, the modules could be synchronized by using a highly accurate time reference such as a GPS clock time. Alternatively, a unique wireless synchronization signal could be broadcast to each of the modules from a central control facility.

In its simplest form a reactive trigger can be based on a user activation based scheme, a packet inspection based scheme, a congestion level based scheme, a heuristic algorithm based scheme and/or an NBA analysis based scheme. In the user activation based scheme, a user-software interaction defines a trigger event. For example, a trigger event occurs when a user of a computing device (e.g., computing device 101-103 of FIG. 1) depresses a given button of a user interface.

Mission Plans

According to a preferred embodiment of the invention, the network maneuvering described herein is controlled in accordance with a mission plan. A mission plan is a schema that defines and controls maneuverability within the context of a network and at least one security model. As such, the mission plan can be represented as a data file that is communicated from the NAC 104 to each module 105-107, 113-114 of FIG. 1. The mission plan is thereafter used by each module to control the manipulation of identity parameters and coordinate its activities with the actions of the other modules in the network.

According to a preferred embodiment, the mission plan can be modified from time to time by a network administrator to update or change the way in which the network maneuvers to thwart potential adversaries. As such, the mission plan provides a network administrator with a tool that facilitates complete control over the time, place and manner in which network maneuvering will occur within the network. Such update ability allows the network administrator to tailor the behavior of the computer network to the current operating conditions and more effectively thwart adversary efforts to infiltrate the network. Multiple mission plans can be defined by a user and stored so that they are accessible to modules within the network. For example, the multiple mission plans can be stored at NAC 104 and communicated to modules as needed. Alternatively, a plurality of mission plans can be stored on each module and can be activated as necessary or desirable to maintain security of the network. For example, if the network administrator determines or suspects that an adversary has discovered a current mission plan for a network, the administrator may wish to change the mission plan. Effective security procedures can also dictate that the mission plan be periodically changed.

The process of creating a mission plan can begin by modeling the computer network 100. The creation of the model is facilitated by an NCSA executing on a computer or server at the network command center. For example, in the embodiment shown in FIG. 1, the NCSA can execute on NAC 104. The network model preferably includes information which defines data connections and/or relationships between various computing devices included in the computer network 100. The NCSA will provide a suitable interface which facilitates entry of such relationship data. According to one embodiment, the NCSA can facilitate entry of data into tables which can be used to define the mission plan. However, in a preferred embodiment, a GUI is used to facilitate this process.

Figure 3:
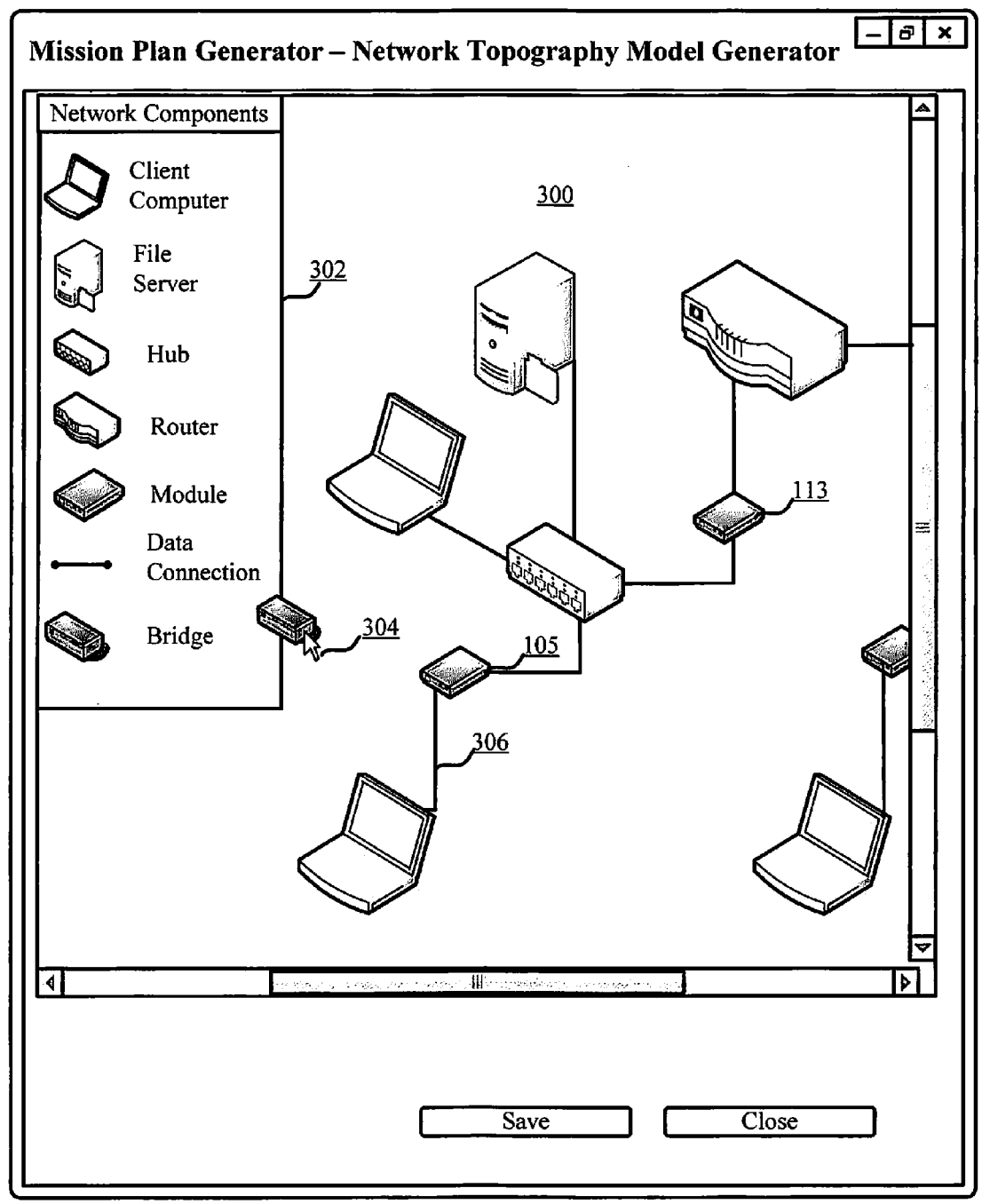
FIG. 3 is a drawing that is useful for understanding a tool that can be used to help characterize the network in FIG. 1.

Referring now to FIG. 3, the NCSA can include a network topography model generator tool. The tool is used to assist the network administrator in defining the relationship between each of the various components of the networks. The network topography tool provides a workspace 300 in which an administrator can drag and drop network components 302, by using a cursor 304. The network administrator can also create data connections 306 between various network components 302. As part of this modeling process, the network administrator can provide network address information for the various network components, including the modules 105-107, 113, 114 of FIG. 1.

Figure 4:
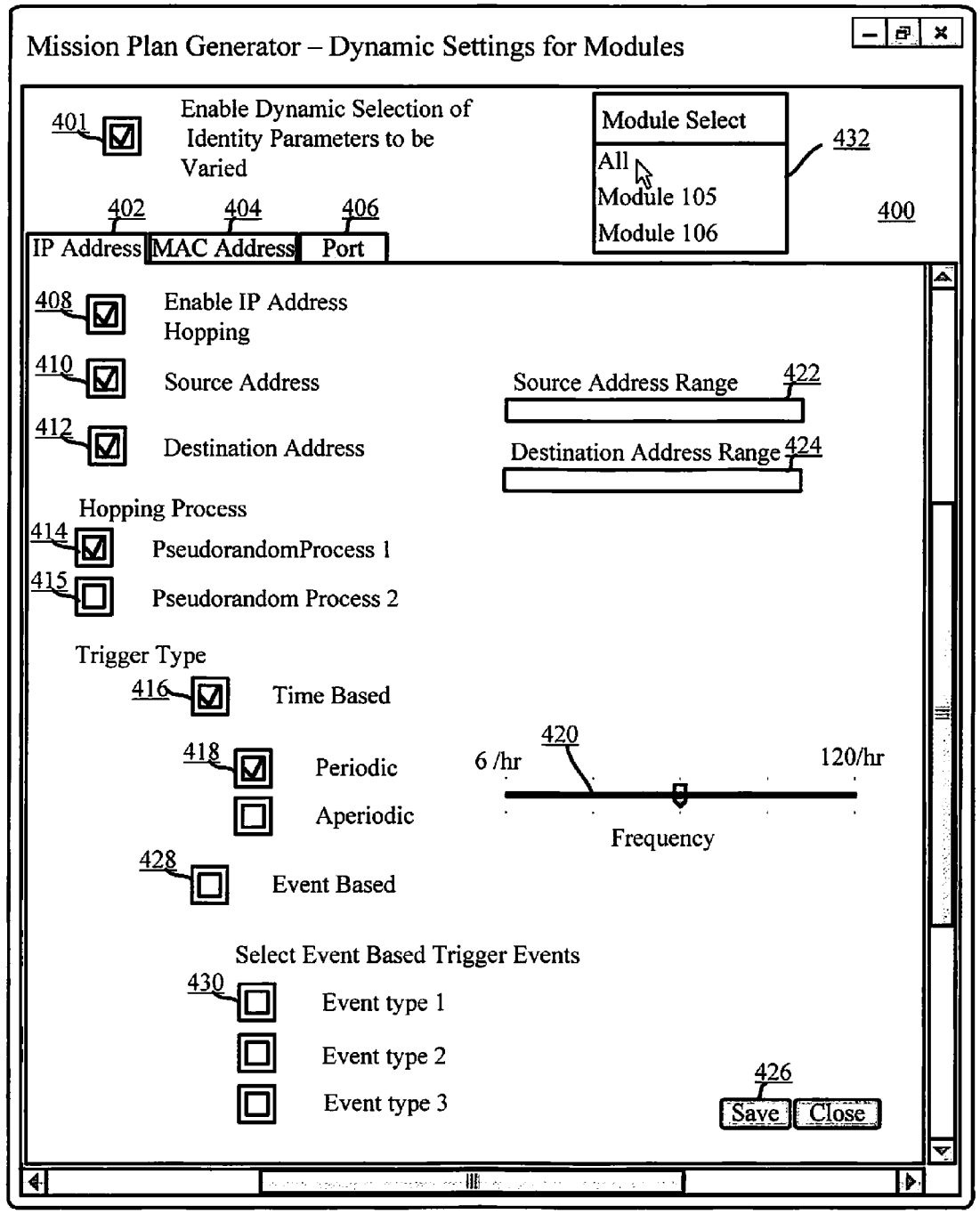
FIG. 4 is an example of a dialog box of a Graphical User Interface ("GUI") that can be used to select dynamic settings for modules in FIG. 1.

Once the network has been modeled, it can be saved and used by the network administrator to define the manner in which the various modules 105-107, 113, 114 behave and interact with one another. Referring now to FIG. 4, the NCSA can generate a dialog box 400 of which can be used to further develop a mission plan. A drop-down menu 432 can be used to select the particular module (e.g., module 105 of FIG. 1) to which the settings in dialog box 400 are to be applied. Alternatively, the network administrator can use drop-down menu 432 to indicate that the settings in dialog box 400 are intended to be applied to all modules within the network (e.g., by selecting the command "All" in the drop-down menu 432). The process can continue by specifying whether a fixed set of identity parameters will always be modified in each of the modules, or whether the set of identity parameters that are manipulated shall be dynamically varied. If the selection or set of identity parameters that are to be manipulated in the modules is intended to be dynamically varied, the network administrator can mark check-box 401 to indicate that preference. If the check-box 401 is not marked, then the set of identity parameters to be varied is a fixed set that does not vary over time.

The dialog box 400 includes tabs 402, 404, 406 which allow a user to select the particular identity parameter that he/she wants to work with for purposes of creating a mission plan. For purposes of this disclosure, the dialog box 400 facilitates dynamic variation of only three identity parameters. Specifically, these include the IP address, MAC address and port address. More or fewer identity parameters can be dynamically varied by providing additional tabs, but the three identity parameters noted are sufficient to explain the inventive concepts. In FIG. 4, the user has selected the tab 402 to work with the IP address type of identity parameter. Within tab 402, a variety of user interface controls 408-420 are provided for specifying the details relating to the dynamic variation of IP addresses within the selected module. More or fewer controls can be provided to facilitate the dynamic manipulation of the IP address type, and the controls shown are merely provided to assist the reader in understanding the concept. In the example shown, the network administrator can enable dynamic variation of IP addresses by selecting (e.g., with a pointing device such as a mouse) the check-box 408 marked: "Enable IP Address Hopping". Similarly, the network administrator can indicate whether the source address, destination address or both are to be varied. In this example, the source and destination address boxes 410, 412 are both marked, indicating that both types of addresses are to be changed. The range of allowed values for the source and destination addresses can be specified by the administrator in list boxes 422, 424.

The particular pseudorandom process used to select false IP address values is specified by selecting a pseudorandom process. This selection is specified in boxes 414, 415. Different pseudorandom processes can have different levels of complexity for variable degrees of true randomness, and the administrator can choose the process that best suits the needs of the computer network 100.

Dialog box 400 also allows a network administrator to set the trigger type to be used for the dynamic variation of the IP address identity parameter. In this example, the user has selected box 416, indicating that a time based trigger is to be used for determining when to transition to new false IP address values. Moreover, checkbox 418 has been selected to indicate that the time based trigger is to occur on a periodic basis. Slider 420 can be adjusted by the user to determine the frequency of the periodic time based trigger. In the example shown, the trigger frequency can be adjusted between six trigger occurrences per hour (trigger every ten minutes) and one hundred twenty trigger occurrences per hour (trigger every thirty seconds). In this example, selections are available for other types of triggers as well. For example, dialog box 402 includes check boxes 428, 430 by which the network administrator can select an event-based trigger. Several different specific event types can be selected to form the basis for such event-based triggers (e.g., Event type 1, Event type 2, etc.). These event types can include the detection of: a packet having a particular origin or destination; a code word contained in a packet; secret or confidential information contained in a packet; a particular level of congestion; a particular traffic pattern; a particular protocol pattern; a particular entropy pattern; a security threat; an NBA of a particular level and/or type; and a particular number of NBAs currently being waged on a computer network. In FIG. 4, tabs 404 and 406 are similar to tab 402, but the controls therein are tailored to the dynamic variation of the MAC address and port value rather than the IP address. Additional tabs could be provided for controlling the dynamic variation of other types of identity parameters.

The mission plan can also specify a plan for dynamically varying the location where identity parameters are modified. In some embodiments, this variable location feature is facilitated by controlling a sequence that defines when each module is in an active state or a bypass state. Accordingly, the mission plan advantageously includes some means of specifying this sequence. In some embodiments of the invention, this can involve the use of defined time intervals or time slots, which are separated by the occurrence of a trigger event.

Figure 5:
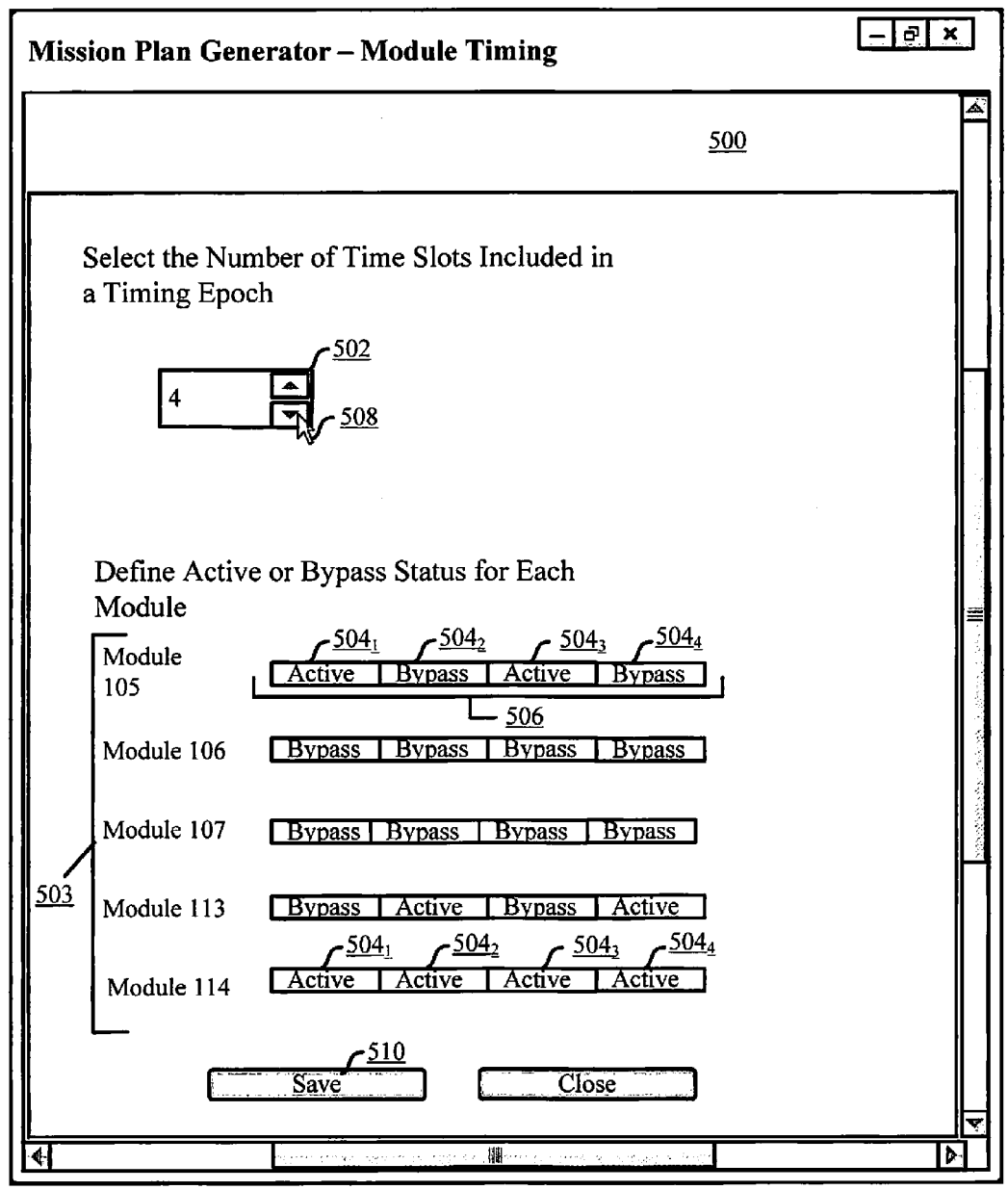
FIG. 5 is an example of a dialog box of a GUI that can be used to select a sequence of active states and bypass states associated with each module in FIG. 1.

Referring now to FIG. 5, a dialog box 500 can be provided by the NCSA to facilitate coordination and entry of location sequence and timing information. Dialog box 500 can include a control 502 for selecting a number of time slots $504_1$-$504_n$, which are to be included within a time epoch 506. In the example illustrated, the network administrator has defined four time slots per timing epoch. The dialog box 500 can also include a table 503 which includes all modules in the computer network 100. For each module listed, the table includes a graphical representation of available time slots $504_1$-$504_4$ for one timing epoch 506. Recall that dynamic control over the location where identity parameters are manipulated is determined by whether each module is in an active or bypass operating states. Accordingly, within the graphical user interface, the user can move a cursor 508 and make selections to specify whether a particular module is in an active or bypass mode during each time slot. In the example shown, module 105 is active during time slot $504_1$ and $504_3$, but is in a bypass mode during time slots $504_2$, $504_4$. Conversely, module 113 is active during time slots $504_2$, $504_4$, but is in bypass mode during time slots $504_1$ and $504_3$. With reference to FIG. 1, this means that manipulation of identity parameters occurs at a location associated with module 105 during time slots $504_1$ and $504_3$, but occurs instead at module 113 during time slots $504_2$, $504_4$.

In the example shown in FIG. 5, the network administrator has elected to have module 114 always operate in an active mode (i.e., module 114 is active during all time slots). Accordingly, for data communications transmitted from client computer 101 to client computer 103, data packets will alternately be manipulated in modules 105, 113, but will always be manipulated at module 114. Finally, in this example, the network administrator has elected to maintain modules 106 and 107 in a bypass mode during time slots $504_1$-$504_4$. Accordingly, no manipulation of identity parameters will be performed at these modules during any of the defined time slots. Once the module timing has been defined in dialog box 500, the network administrator can select the button 510 to store the changes as part of an updated mission plan. The mission plan can be saved in various formats. In some embodiments, the mission plan can be saved as a simple table or other type of defined data structure that can be used by each module for controlling the behavior of the module.

Distribution and Loading of Mission Plans

The distribution and loading of mission plans as disclosed herein will now be described in further detail. Referring once again to FIG. 1, it can be observed that the modules 105-107, 113, 114 are distributed throughout the computer network 100 at one or more locations. The modules are integrated within the communications pathways to intercept communications at such locations, perform the necessary manipulations, and forward data to other computing devices within the network. With the foregoing arrangement, any necessary maintenance of the modules described herein (e.g., maintenance to update a mission plan) will have the potential to disrupt network communications while the modules are replaced or reprogrammed. Such disruptions are undesirable in many situations where reliability and availability of network services is essential. For example, uninterrupted network operation can be essential for computer networks used by military, emergency services and businesses.

In order to ensure uninterrupted network operations, each module preferably has several operating states. These operating states include (1) an off state in which the module is powered down and does not process any packets, (2) an initialization state in which the module installs software scripts in accordance with the mission plan, (3) an active state in which data is processed in accordance with a current mission plan, and (4) a by-pass state in which packets can flow through the module as if the module was not present. The module is configured so that, when it is in the active state or the by-pass state, the module can receive and load an updated mission plan provided by a network administrator. The module operating states can be manually controlled by the network administrator by means of the NCSA executing, for example, on NAC 104. For example, the user can select operating states for various modules through the use of a graphical user interface control panel. Commands for controlling the operating states of the network are communicated over the computer network 100, or can be communicated by any other suitable means. For example, a separate wired or wireless network (not shown) can be used for that purpose.

Figure 6:
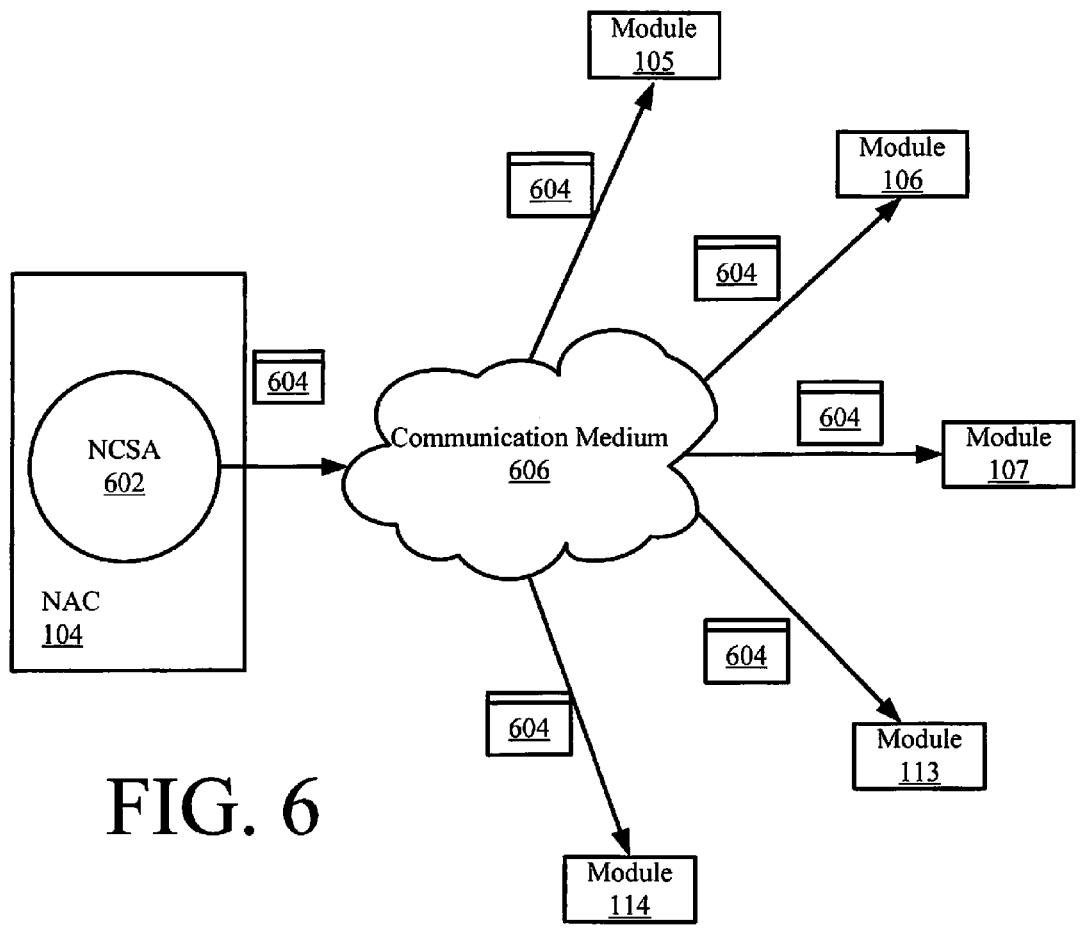
FIG. 6 is a diagram that is useful for understanding the way in which a mission plan can be communicated to a plurality of modules in the network in FIG. 1.
Figure 7:
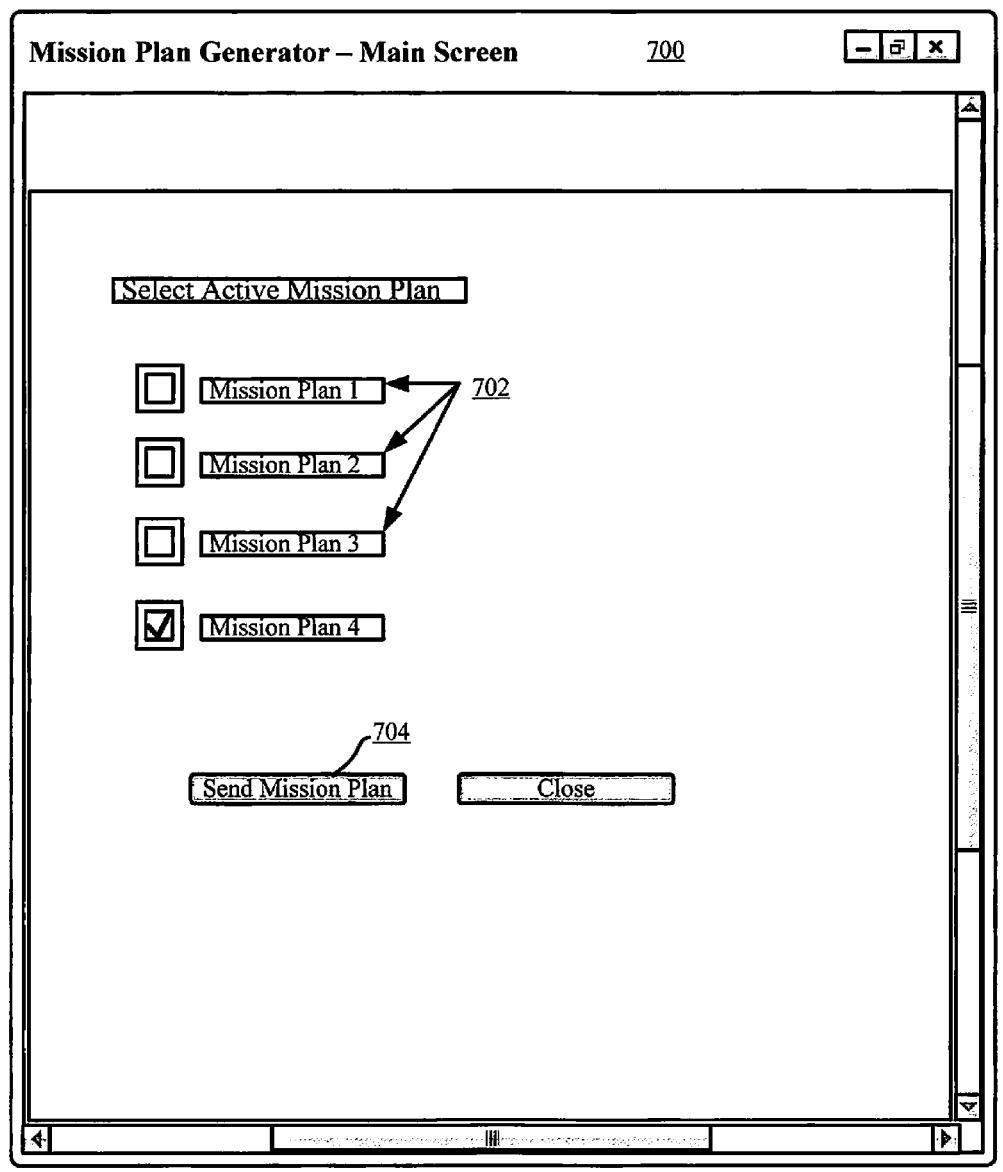
FIG. 7 is an example of a dialog box of a GUI that can be used to select a mission plan and communicate the mission plan to the modules as shown in FIG. 6.

The mission plan can be loaded directly at the physical location of each module, or it can be communicated to the module from the NCSA. This concept is illustrated in FIG. 6, which shows mission plans 604 being communicated from NCSA 602 to each of the modules 105-107, 113, 114 over a communication medium 606. In the example shown, the NCSA software application is executing on NAC 104 operated by a network administrator. The communication medium can in some embodiments include in-band signaling using computer network 100. Alternatively, an out-of-band network (e.g., a separate wireless network) can be used as the communication medium 606 to communicate the updated mission plan from the NCSA to each module. As shown in FIG. 7, the NCSA can provide a dialog box 700 to facilitate selection of one of several mission plans 702. Each of these mission plans 702 can be stored on NAC 104. The network administrator can select from one of the several mission plans 702, after which they can activate a "Send Mission Plan" button 704. Alternatively, a plurality of mission plans can be communicated to each module and stored there. In either scenario, the user can choose one of the defined mission plans to activate.

In response to the command to send the mission plan, the selected mission plan is communicated to the modules while they are in an active state in which they are configured for actively performing dynamic modification of identity parameters as described herein. Such an arrangement minimizes the time during which the network operates in the clear and without manipulating identity parameters. However, the updated mission plan can also be communicated to the modules while they are in the by-pass mode, and this approach may be desirable in certain cases.

Once the mission plan is received by a module, it is automatically stored in a memory location within the module. Thereafter, the module can be caused to enter the by-pass state and, while still in that state, the module can load the data associated with the new mission plan. This process of entering into the by-pass state and loading the new mission plan data can occur automatically in response to receipt of the mission plan, or can occur in response to a command from the NCSA software controlled by the network administrator. The new mission plan preferably includes changes in the way that identity parameter values are varied. Once the new mission plan has been loaded, the modules 105-107, 113, and 114 can be transitioned from the by-pass mode to the active mode in a synchronized way to ensure that data communication errors do not occur. The mission plan can specify a time when the modules are to return to the active mode, or the network administrator can use the NCSA to communicate a command to the various modules, directing them to enter into the active mode. The foregoing process of updating a mission plan advantageously allows changes in network security procedures to occur without disrupting communication among the various computing devices attached to the computer network 100.

The dynamic manipulation of various identity parameters at each module 105, 106, 107, 113, and 114 is preferably controlled by the application software executing on each module 105-107, 113, 114. However, the behavior of the application software is advantageously controlled by the mission plan.

Figure 8:
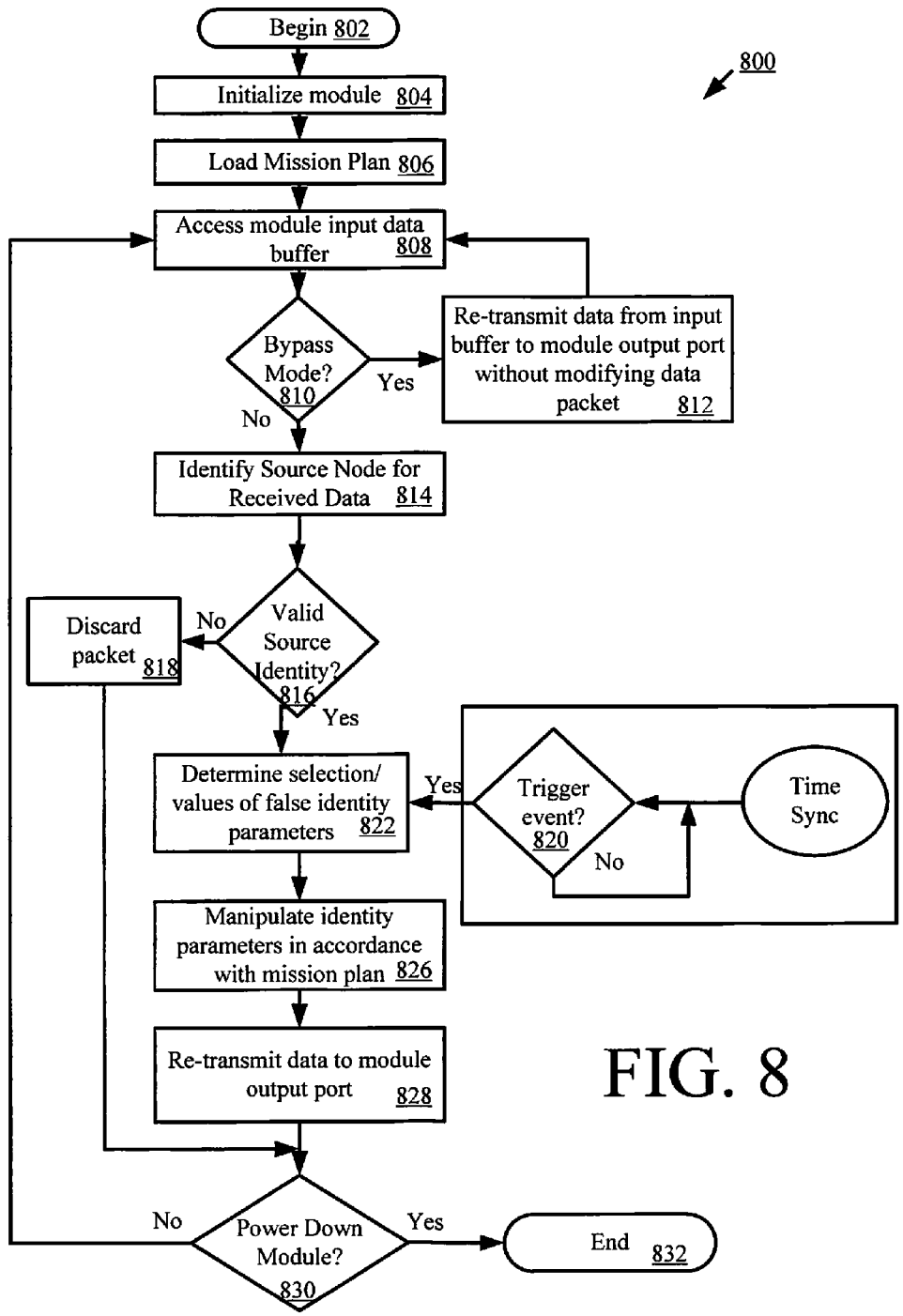
FIG. 8 is a flowchart that is useful for understanding the operation of a module in FIG. 1.

Referring now to FIG. 8, there is provided a flowchart which summarizes the operation of each module 105-107, 113, 114. To avoid confusion, the process 800 is described with respect to communications in a single direction. For example, in the case of module 105, the single direction could involve data transmitted from client computer 101 to hub 108. In practice however, it is preferred that modules 105-107, 113, 114 operate bi-directionally. The process begins at step 802 when the module is powered up and continues to step 804 where module application software is initialized for executing the methods described herein. In step 806, a mission plan is loaded from a memory location within the module. At this point, the module is ready to begin processing data and proceeds to do so at step 808, where it accesses a data packet from an input data buffer of the module. In step 810, the module checks to determine if it is in a bypass mode of operation. If so, the data packet accessed in step 808 is retransmitted in step 812 without any modification of the data packet. If the module is not in bypass mode, then it must be in its active mode of operation and continues on to step 814. In step 814, the module reads the data packet to determine the identity of a source node from which the data packet originated. In step 816, it examines the packet to determine if the source node is valid. The specified source node can be compared to a list of valid nodes to determine if the specified source node is currently valid. If it is not a valid node then the packet is discarded in step 818. In step 820, the process checks to determine if a trigger event occurred. The occurrence of a trigger event will influence the selection of false identify values to use. Accordingly, in step 822, the module determines the false identify values to use based on one or more of the trigger information, clock time and mission plan. The module then continues to step 826 where it manipulates identity parameters of the data packet. The manipulated identity parameters in the packet can include identity parameters of a source computing device and/or a destination computing device. Once manipulations are complete, the data packet is re-transmitted to an adjacent node from the output port of the module. In step 830, a determination is made as to whether the module has been commanded to power down. If so, the process ends at step 832. In step 808, the process continues and the next data packet is accessed from the module's input data buffer.

Figure 9:
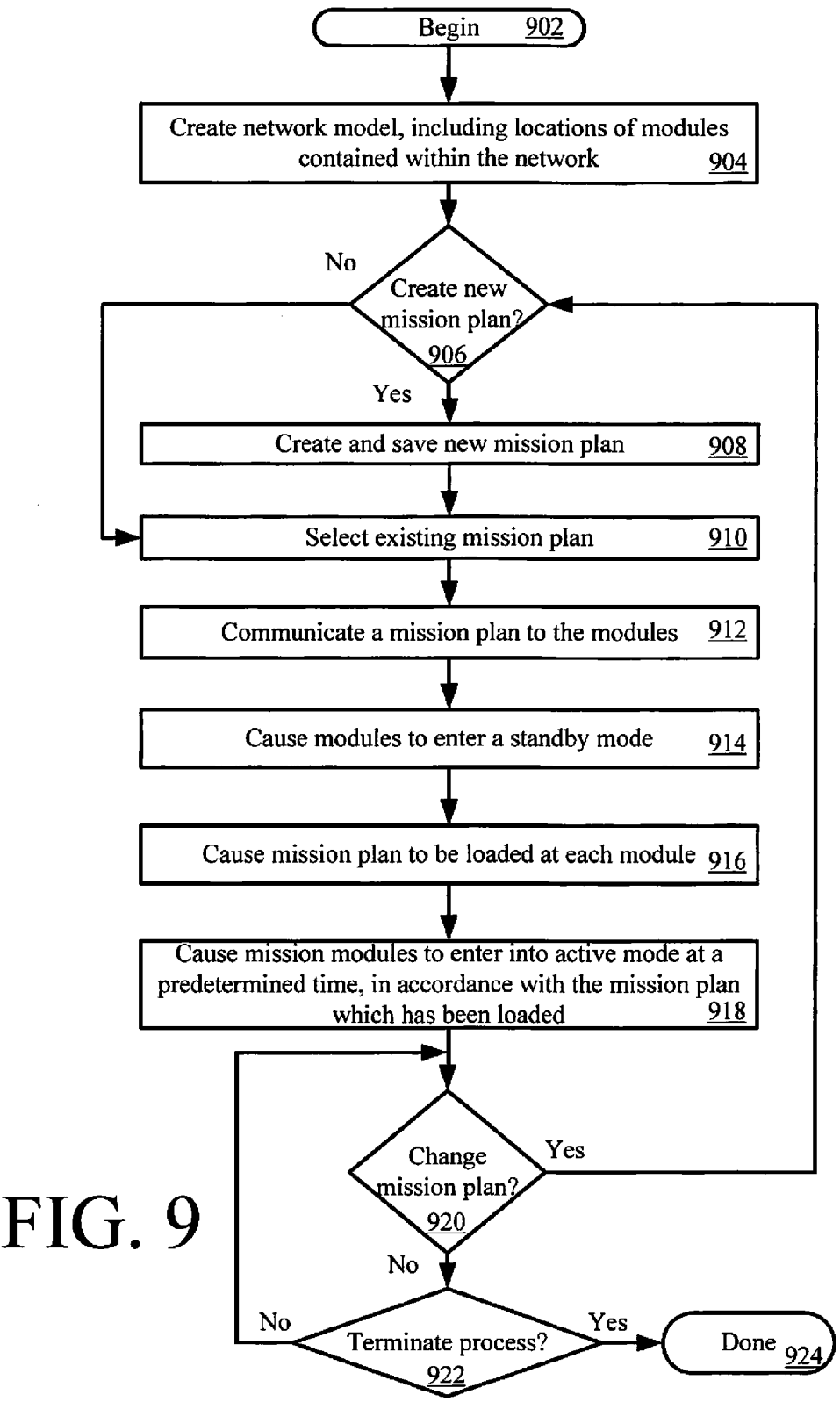
FIG. 9 is a flowchart that is useful for understanding the operation of a Network Control Software Application ("NCSA") in relation to creating and loading mission plans.

Referring now to FIG. 9, there is provided a flowchart which summarizes the methods described herein for managing a dynamic computer network. The process begins in step 902 and continues to step 904, where a network model is created (e.g., as shown and described in relation to FIG. 3). In step 906, a determination is made as to whether a new mission plan is to be created. If so, a new mission plan is created in step 908 and the process continues to step 910, where the new mission plan is selected. Alternatively, if in step 906 a desired mission plan has already been created, then the method can continue directly to step 910 where an existing mission plan is selected. In step 912, the mission plan is communicated to the modules (e.g., modules 105-107, 113, 114 of FIG. 1), where the mission plan is stored in a memory location. When the network administrator is ready to implement the new mission model, a command is sent in step 914 which causes the modules to enter a standby mode as described herein. While the modules are in this standby mode, the mission plan is loaded at step 916. Loading of the mission plan occurs at each module so that the mission plan can be used to control the operations of an application software executing on the module. In particular, the mission plan is used to control the way in which the application software performs dynamic manipulations of identity parameters. In step 918, the mission modules are again caused to enter into an active operational mode in which each mission module performs manipulations of identity parameters in accordance with the mission plan. Steps 914, 916 and 918 can occur in response to specific commands sent from a network administrator, or can occur automatically at each module in response to receiving the mission plan in step 912. After step 918, the modules continue performing processing in accordance with the mission plan which has been loaded. In step 920, the process continues by checking to determine if the user has indicated a desired to change the mission plan; if so, the process returns to step 906, where it continues as described above. If there is no indication that the user or network administrator wishes to change an existing mission plan, then the process determines in step 922 whether it has been instructed to terminate. If so, the process terminates in step 924. If no termination instruction is received, the process returns to step 920 and continues.

Figure 10:
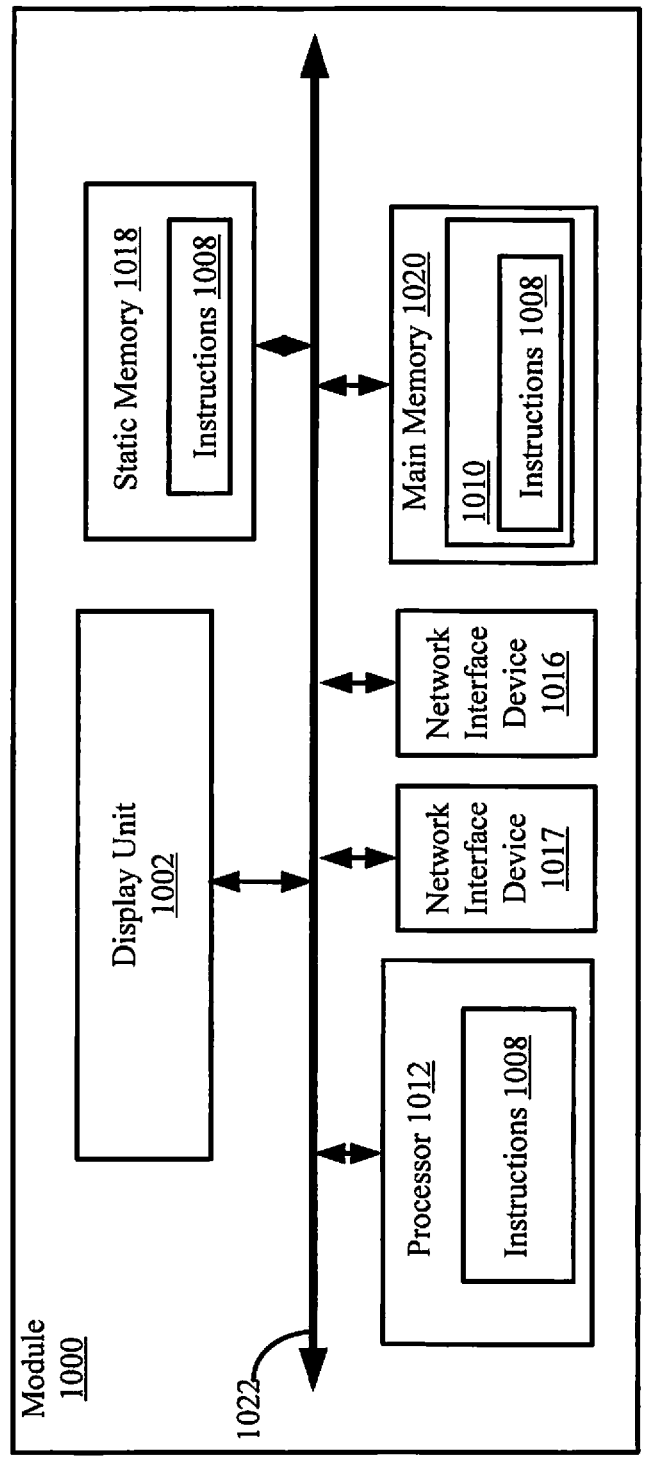
FIG. 10 is a block diagram of a computer architecture that can be used to implement the modules in FIG. 1.

Referring now to FIG. 10, there is provided a block diagram which shows a computer architecture of an exemplary module 1000 which can be used for performing the manipulation of identity parameters described herein. The module 1000 includes a processor 1012 (such as a Central Processing Unit ("CPU")), a main memory 1020 and a static memory 1018, which communicate with each other via a bus 1022. The module 1000 can further include a display unit 1002, such as a Liquid Crystal Display ("LCD") to indicate the status of the module. The module 1000 can also include one or more network interface devices 1016, 1017 which allow the module to receive and transmit data concurrently on two separate data lines. The two network interface ports facilitate the arrangement shown in FIG. 1, where each module is configured to concurrently intercept and re-transmit data packets received from two separate computing devices on the network.

The main memory 1020 includes a computer-readable storage medium 1010 on which is stored one or more sets of instructions 1008 (e.g., software code) configured to implement one or more of the methodologies, procedures, or functions described herein. The instructions 1008 can also reside, completely or at least partially, within the static memory 1018, and/or within the processor 1012 during execution thereof by the module. The static memory 1018 and the processor 1012 also can constitute machine-readable media. In the various embodiments of the present invention a network interface device 1016 connected to a network environment communicates over the network using the instructions 1008.

The instructions 1008 cause the module 1000 to act as a translator of identity parameters between those of a packet-based static network and those of a packet-based MTT enabled network. A conventional protocol stack for the packet-based static network is provided in FIG. 11. According to the embodiment shown in FIG. 11, the protocol stack 1100 includes five layers 1102, 1104, 1106, 1108, 1110 specifying particular functions of nodes within the packet-based static network. Still, the invention is not limited in this regard. The protocol stack 1100 can include any number of layers in accordance with a particular packet-based static network application. For example, if an Open System Interconnection ("OSI") protocol stack is employed by the static network then the protocol stack 1100 can further include a session layer and a presentation layer.

Referring again to FIG. 11, the protocol stack 1100 provides a framework illustrating how information is passed from a software application installed in a first node of the static network (e.g., a client computer) to a software application installed in a second node of the static network (e.g., a client computer). The protocol stack 1100 is well known to persons skilled in the art. Thus, the protocol stack 1100 will not be described in detail herein. However, a brief discussion is provided below to assist a reader in understanding the identity parameter translation which is performed at least by the modules 105-108, 114 of FIG. 1.

Figure 11:
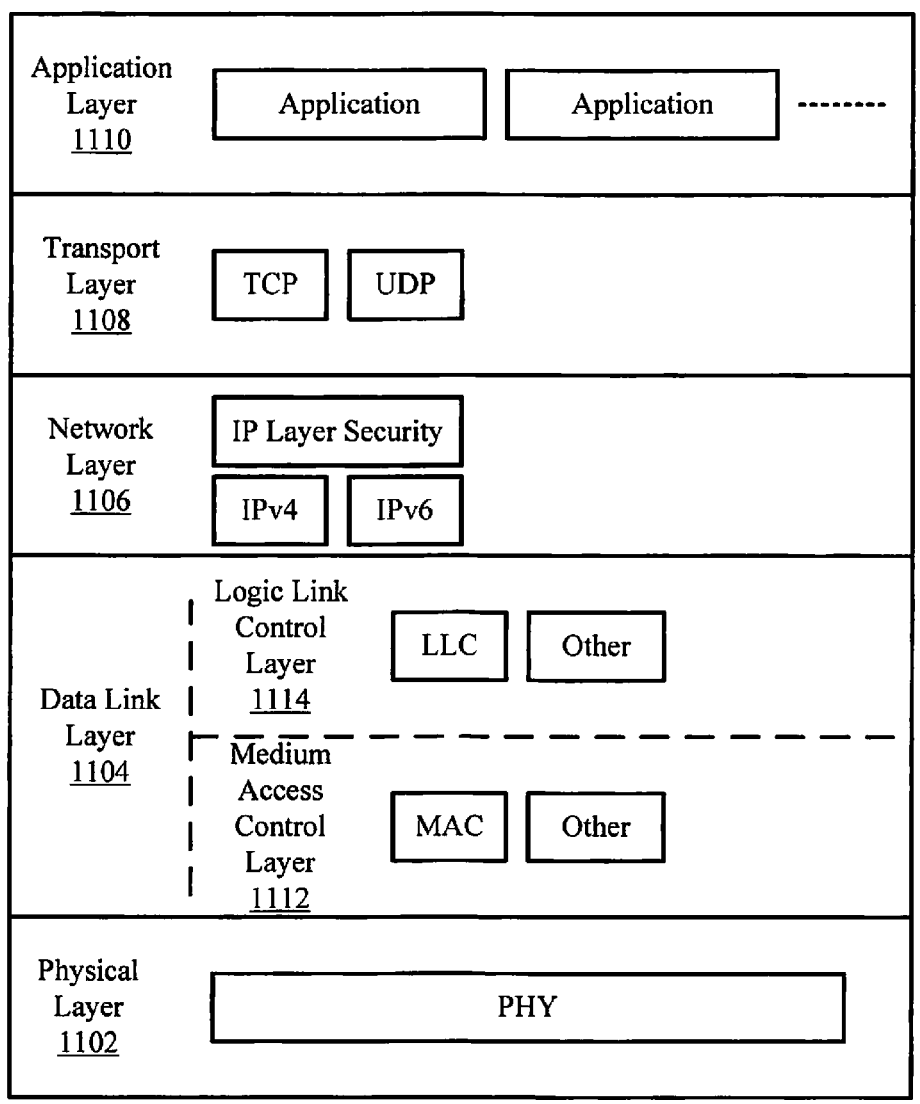
FIG. 11 is a schematic illustration of a conventional protocol stack.

As shown in FIG. 11, the protocol stack 1100 is comprised of a physical layer 1102, a data link layer 1104, a network layer 1106, a transport layer 1108, and an application layer 1110. The physical layer 1102 is comprised of firmware and/or hardware configured to send and receive data through a network. The data link layer 1104 provides transmission protocols for transferring data between network nodes. Such transmission protocols can include an Ethernet protocol (or an IEEE 802.3 protocol), a point-to-point protocol, an IEEE 802.11 protocol, an IEEE 802.15 protocol, an IEEE 802.16 protocol, and other such protocols.

The data link layer 1104 can be comprised of two (2) sub-layers, namely a Logic Link Control ("LLC") layer 1114 and a Media Access Control ("MAC") layer 1112. The LLC layer 1114 is comprised of firmware and/or hardware configured to multiplex protocols prior to being transmitted over the MAC layer 1112 and to demultiplex protocols subsequent to being transmitted and upon receipt. The LLC layer 1114 is also comprised of firmware and/or hardware configured to provide flow control of packets, detection of packets, and retransmission of dropped packets.

The MAC layer 1112 is comprised of firmware and/or hardware configured to determine when to transmit communications and when to receive communications. In this regard, the MAC layer 1112 performs actions involving coordinating access to a shared radio channel and utilizing protocols that enhance communications over a wireless link. The term "protocol" as used herein refers to a set of rules defining how information is exchanged between network nodes. Such network nodes include, but are not limited to, the client computers, servers, routers, switches and bridges. The MAC layer 1112 provides transmission protocols for transferring data between network nodes. Such transmission protocols include MAC protocols. MAC protocols ensure that signals sent from different nodes across the same channel do not collide.

The network layer 1106 is comprised of firmware configured to transfer data from one node to another node. In this regard, the network layer 1106 provides protocols for transferring data from one node to another node. The transmission protocols include routing protocols and forwarding protocols. Such transmission protocols include internet protocols, such as a version four of the internet protocol ("IPv4"), a version six of the internet protocol ("IPv6"), and internet security protocols ("IP Layer Security").

The transport layer 1108 is comprised of firmware configured to communicate data between end systems. In this regard, the transport layer 1108 provides transport protocols for transmission of data between end systems. Such transport protocols include a Transmission Control Protocol ("TCP") and a User Datagram Protocol ("UDP"). The application layer 1110 is generally implemented only in firmware. The application layer 1110 provides signaling protocols for end-user applications, such as authentication applications, data syntax applications, quality of service applications, and end-user applications.

Figure 12:
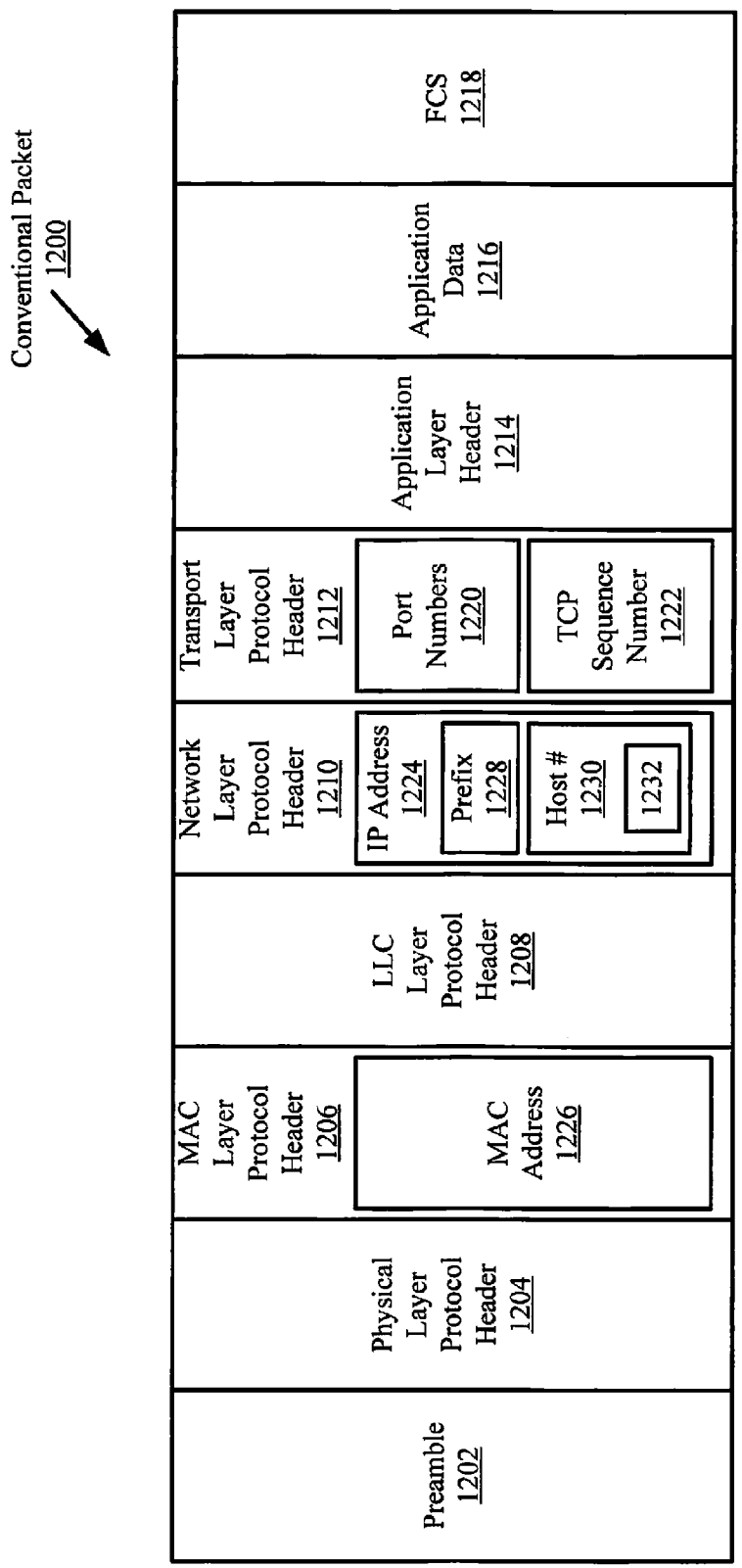
FIG. 12 is a schematic illustration of a conventional packet.

Referring now to FIG. 12, there is provided a block diagram of a conventional packet 1200 of a static network. The packet 1200 is comprised of a preamble 1202, a physical layer protocol header 1204, a MAC layer protocol header 1206, an LLC layer protocol header 1208, a network layer protocol header 1210, and a transport layer protocol header 1212. The packet 1200 is also comprised of an application layer header 1214, an application data 1216, and a Frame Check Sequence ("FCS") 1218. The phrase "frame check sequence", as used herein, refers to extra checksum characters added to a packet or a frame in a communication protocol for error detection and correction. Each of the listed components of the packet 1200 are well known to persons skilled in the art and are well defined in open industry standards of the Institute of Electrical and Electronics Engineers ("IEEE") standard for local and metropolitan area networks and Internet Engineering Task Force ("IEFT"). Thus, such components will not be described in detail herein.

However, it should be appreciated that the application data 1216 can be signaling protocol data, user data, or management data. The user data can include voice data, video data, or the like. It should also be appreciated that the application data 1216 is encapsulated between the application layer header 1214 and the FCS 1218. The application layer header 1214 is encapsulated between the transport layer protocol header 1212 and the application data 1216. Similarly, the transport layer protocol header 1212 is encapsulated between the network layer protocol header 1210 and the application layer header 1214. Likewise, the network layer protocol header 1210 is encapsulated between the LLC layer protocol header 1208 and transport layer protocol header 1212. The LLC layer protocol header 1208 is encapsulated between the MAC layer protocol header 1206 and the network layer protocol header 1210. The MAC layer protocol header 1206 is encapsulated between the physical layer protocol header 1204 and the LLC layer protocol header 1208. The physical layer protocol header 1204 is encapsulated between the preamble 1202 and the MAC layer protocol header 1206.

The transport layer protocol header 1212 comprises source and destination port numbers 1220. A port is an application-specific software construct serving as a communications endpoint in a computer's operating system. A port is identified for each IP address and protocol by a sixteen bit number (i.e., a port number 1220).

The transport layer protocol header 1212 also comprises a TCP sequence number 1222. Two client computers communicating with each other on opposite sides of a TCP session will each maintain a TCP sequence number 1222. The TCP sequence number 1222 allows each computer to track how much data it has communicated. The TCP sequence number is included in the TCP header portion of each packet which is communicated during the session. At the initiation of a TCP session, the initial sequence number value is randomly selected.

The network layer protocol header 1210 comprises source and destination IP addresses 1224. An IP address 1224 is a numerical identifier assigned to a computing device participating in a computer network where the network uses the well known internet protocol for communication. The IP address 1224 can be a thirty two bit number in an IPv4 system or one hundred twenty eight bit number in an IPv6 system. The IP address 1224 is a binary number, but is usually stored in a text file and displayed in a human-readable notation (e.g., 175.18.252.1. for IPv4 systems and 2003:db6:0:1234:0:469:6:1 for IPv6).

In some embodiments, each IP address 1224 can be thought of as a single identity parameter. However, an IP address 1224 is generally defined as including at least two parts which include a network prefix 1228 and a host number 1230. The network prefix 1228 identifies a network to which a data packet 1200 is to be communicated. The host number 1230 identifies the particular node within a Local Area Network ("LAN"). A sub-network (sometimes referred to as a subnet) is a logical portion of an IP network. Where a network is divided into two or more sub-networks, a portion of the host number 1230 of the IP address 1224 is used to specify a subnet number 1232. For purposes of the present invention, the network prefix 1228, the subnet number 1232 and the host number 1230 can each be considered to be a separate identity parameter. Since a source IP address and a destination IP address is contained in the network layer protocol header 1210, there are a total of six different identity parameters in the header 1210.

The MAC layer protocol header 1206 comprises a MAC Address 1226. A MAC address 1226 is a unique value assigned to a network interface device by a manufacturer and stored in an onboard ROM. The MAC address 1226 can include a forty-eight bit number or a sixty-four bit number depending on the protocol employed by the MAC layer 1112 of the protocol stack 1100.

Figure 13:
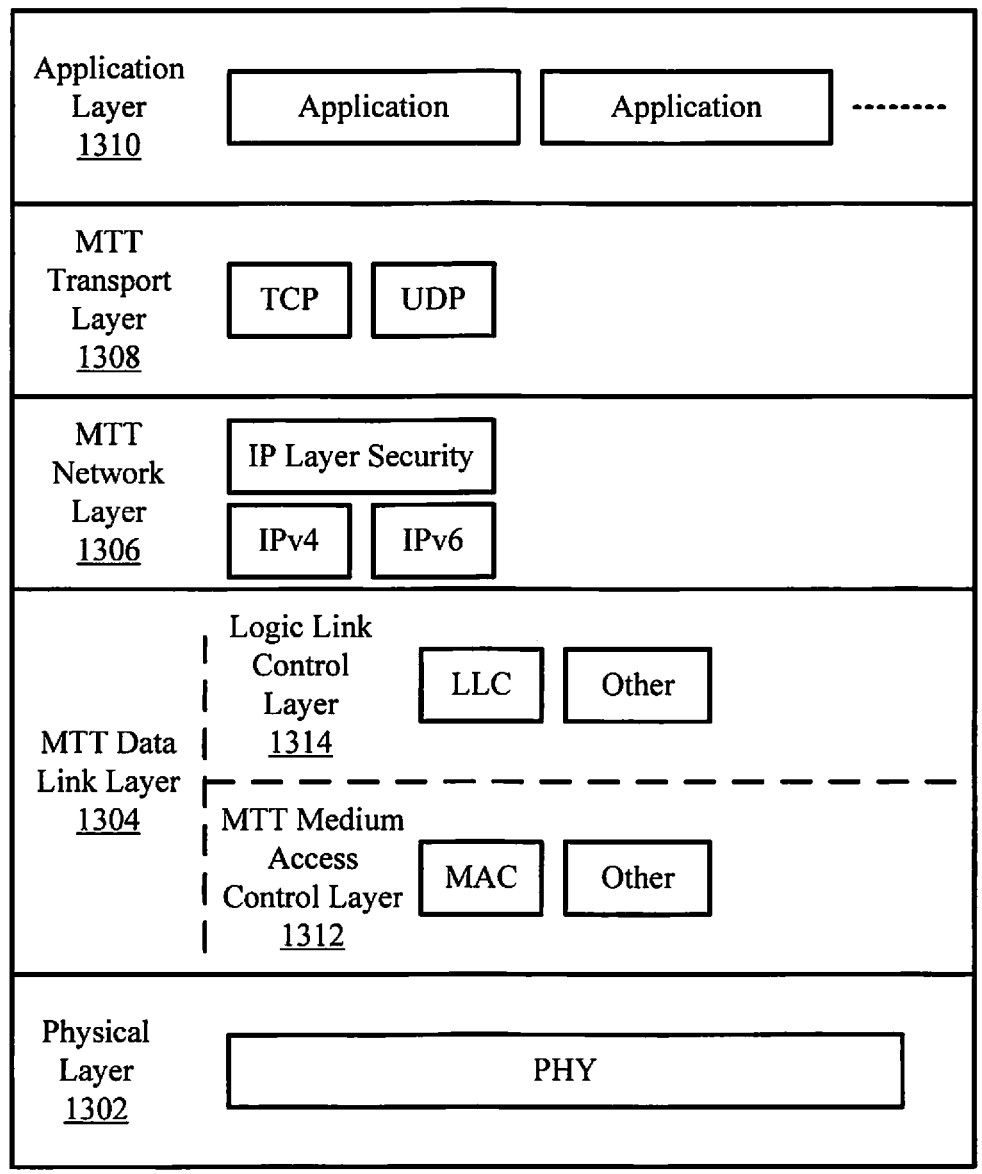
FIG. 13 is a schematic illustration of a Moving Target Technology ("MTT") protocol stack.

The nodes comprising an MTT enabled network can employ protocols of an MTT protocol stack. A schematic illustration of an exemplary MTT protocol stack 1300 is provided in FIG. 13. As shown in FIG. 13, the MTT protocol stack 1300 comprises five layers 1302-1314 specifying particular functions of nodes within the MTT enabled network. Notably, some of the layers 1302, 1310, 1314 are the same as those 1102, 1110, 1114 of the protocol stack 1100. As such, the description provided above in relation to these layers 1102, 1110, 1114 is sufficient for understanding layers 1302, 1310, 1314 of FIG. 13. However, the MTT protocol stack 1300 comprises layers 1304-1308 which are different than those 1104-1108 of protocol stack 1100. As such, a brief discussion of these layers will be provided below.

The MTT data link layer 1304 can be comprised of two (2) sub-layers, namely an LLC layer 1314 and an MTT MAC layer 1312. The LLC layer 1314 is the same as or substantially similar to the LLC layer 1114 of FIG. 11. As such, the description provided above in relation to layer 1114 is sufficient for understanding layer 1314. The MTT MAC layer 1312 is different than the MAC layer 1112 of FIG. 11. In this regard, it should be understood that the MAC layer 1112 employs a static MAC address 1226 for each network interface device. In contrast, the MTT MAC layer 1312 employs a non-static MAC address (e.g., MTT MAC address 1426 of FIG. 14) for each network interface device. The non-static MAC address is dynamically variable. For example, the non-static MAC address can be randomly or pseudo-randomly changed during operation of the MTT enabled network.

The MTT network layer 1306 is different than the network layer 1106 of FIG. 11. In this regard, it should be understood that the network layer 1106 employs static IP addresses 1224. In contrast, the IP addresses (e.g., MTT IP addresses 1424 of FIG. 14) of the MTT network layer 1306 are non-static, i.e., they can be dynamically varied during operations of the MTT enabled network. For example, an IP address number can be changed in accordance with a pseudo-random process.

The MTT transport layer 1308 is different than the transport layer 1108 of FIG. 11. The transport layer employs static port numbers 1220 and static TCP sequence numbers 1222. In contrast, the port numbers (e.g., numbers 1420 of FIG. 14) and TCP sequence numbers (e.g., numbers 1422 of FIG. 14) employed by the MTT transport layer 1308 are non-static. In this regard, it should be understood that each of the non-static port numbers and sequence numbers can be changed in accordance with a random or pseudo-random process.

Figure 14:
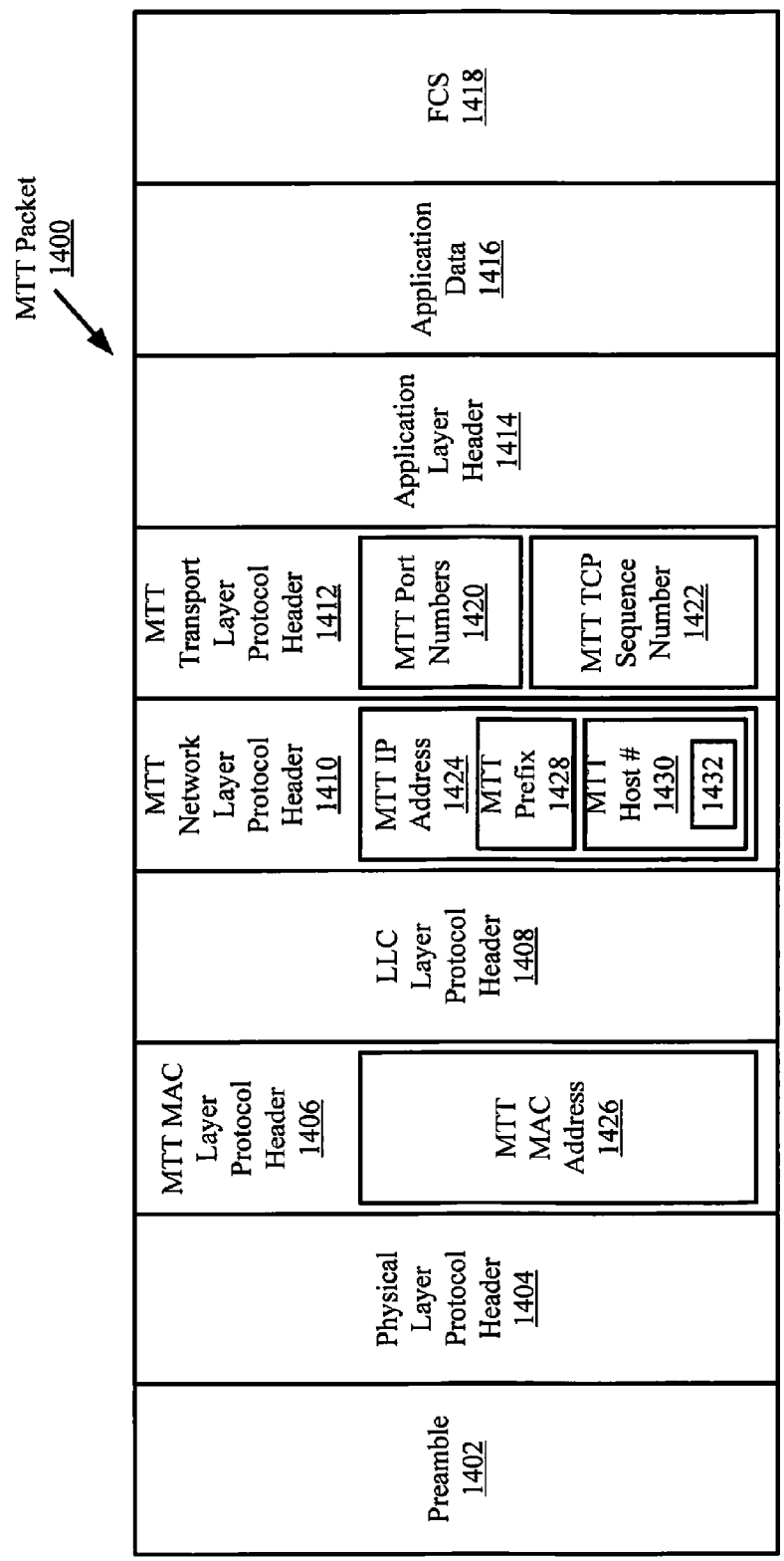
FIG. 14 is a schematic illustration of an MTT packet.

Referring now to FIG. 14, there is provided a schematic illustration of an exemplary MTT packet 1400 of the MTT enabled network. The MTT packet 1400 is comprised of a preamble 1402, a physical layer protocol header 1404, an MTT MAC layer protocol header 1406, an LLC layer protocol header 1408, an MTT network layer protocol header 1410, an MTT transport layer protocol header 1412, an application layer header 1414, application data 1416 and an FCS 1418. Portions 1402, 1404, 1408, 1414, 1416, 1418 of the MTT packet 1400 are the same as or substantially similar to portions 1202, 1204, 1208, 1214, 1216, 1218 of FIG. 12. As such, the description provided above in relation to portions 1202, 1204, 1208, 1214, 1216, 1218 is sufficient for understanding portions 1402, 1404, 1408, 1414, 1416, 1418 of the MTT packet 1400. However, portions 1406, 1410, 1412 are different than portions 1206, 1210, 1212 of FIG. 12. As such, each of the portions 1406, 1410, 1412 will be described herein.

The MTT transport layer protocol header 1412 comprises MTT source and destination port numbers 1420. A port is an application-specific software construct serving as a communications endpoint in a computer's operating system. A port is identified for each IP address and protocol by a sixteen bit number. The sixteen bit number is referred to in relation to an MTT enabled network as an MTT port number 1420. Notably, each MTT port number 1420 is a non-static number (i.e., it can be changed by a module in accordance with a random or pseudo-random process). The MTT transport layer protocol header 1412 also comprises an MTT TCP sequence number 1422. The MTT TCP sequence number 1422 is a non-static number. Manipulation of the MTT port number 1420 and the MTT TCP sequence number 1422 can be accomplished by simply modifying the TCP header information to change values thereof.

The MTT network layer protocol header 1410 comprises source and destination MTT IP addresses 1424. A value of each MTT IP address 1424 can be dynamically varied in accordance with a random or pseudo-random process. Each MTT IP address 1424 comprises an MTT prefix 1428 and an MTT host number 1430. Each of these components 1428, 1430 can also be dynamically varied during operation of an MTT enabled network. Manipulation of the MTT IP addresses 1424, the MTT prefix 1428 and the MTT host number 1430 can be achieved by simply modifying the IP header information of the MTT network layer protocol header 1410.

The MTT MAC layer protocol header 1406 comprises an MTT MAC Address 1426. The MTT MAC address 1426 can be dynamically varied during operation of the MTT enabled network. Manipulation of the MTT MAC address 1426 can be achieved by simply modifying an Ethernet header information of the MTT MAC layer protocol header 1406.

Figure 15:
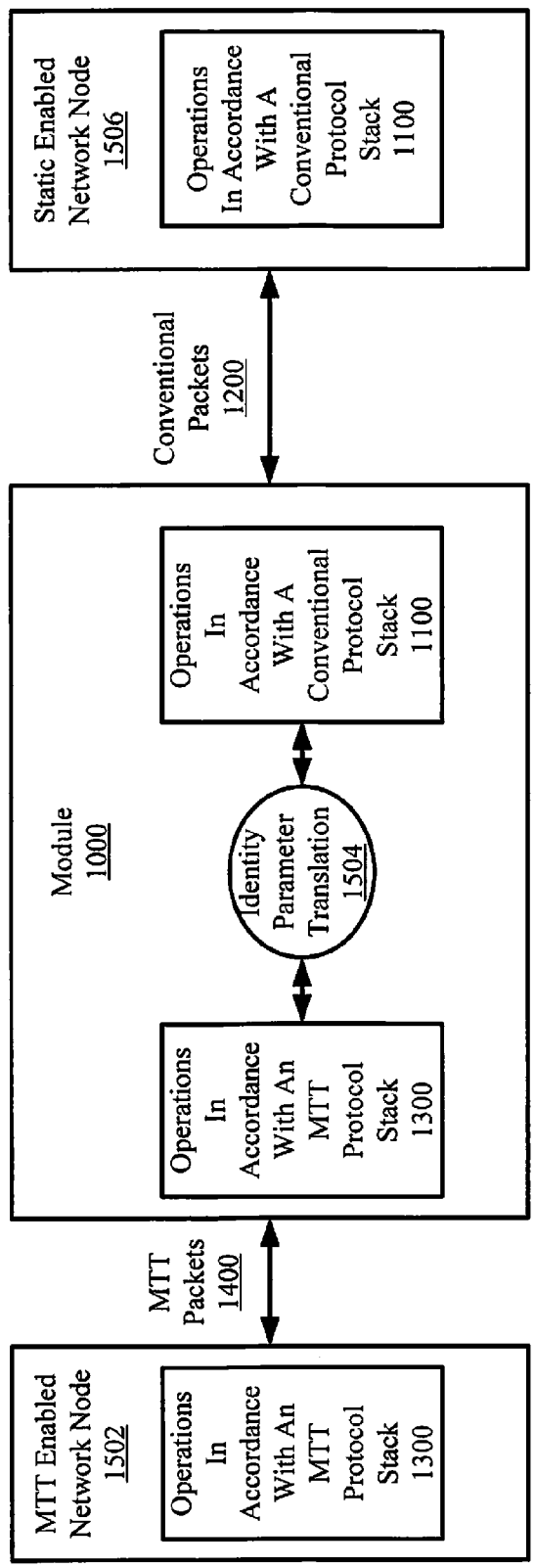
FIG. 15 is a schematic illustration that is useful for understanding the operations of a module configured to translate identity parameters.

Referring now to FIG. 15, there is provided a schematic illustration that is useful for understanding operations of the module 1000 when it is implemented as hardware. Although the modules were described above as comprising standalone hardware devices, the present invention is not limited in this regard. The modules can alternatively be implemented as software that runs on the various comprising an MTT enabled network.

As shown in FIG. 15, the module 1000 performs operations in accordance with both protocol stacks 1200, 1400. In this regard, the module 1000 is configured to communicate MTT packets 1400 to and from an MTT enabled network node 1502 (e.g., a node 104-109, 111 or 112 of FIG. 1). The module 1000 is also configured to communicate conventional packets 1200 to and from a static enabled network node 1506 (e.g., a node 136, 138 of FIG. 1). The module 1000 is further configured to convert conventional packets 1200 into MTT enabled packets 1400, and vice versa. This packet conversion is achieved via an Identity Parameter Translation ("IPT") 1504. A process for achieving an IPT generally involves: de-encapsulating and re-encapsulating application layer portions 1214, 1216, 1414, 1416 of the packets 1200, 1400; or simply modifying header and/or trailer values of the packets 1200, 1400. Methods for encapsulating/decapsulating packets and modifying packet content are well known in the art, and therefore are not be described herein. Any known method or to be known method for encapsulating/de-encapsulating packets and/or modifying packet content can be used with the present invention without limitation. Examples of such processes for achieving an IPT are illustrated in FIGS. 16 and 17.

Figure 16:
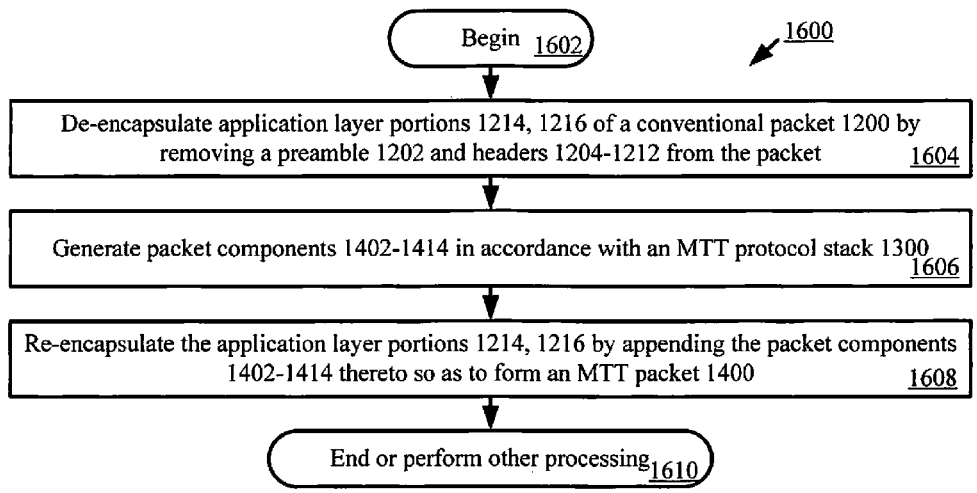
FIGS. 16-17 each provide a flow diagram of an exemplary process for changing at least one identity parameter of a packet.

As shown in FIG. 16, an exemplary process 1600 begins at step 1602 and continues with step 1604. In step 1604, the application layer portions 1214, 1216 of the conventional packet 1200 are de-encapsulated by removing the preamble 1202 and headers 1204-1212 from the packet. In a next step 1606, the packet components 1402-1414 are generated in accordance with the protocols of the MTT protocol stack 1300. Thereafter, step 1608 is performed where the application layer portions 1214, 1216 are re-encapsulated so as to form an MTT packet 1400. The re-encapsulation is achieved by appending the packet components 1402-1414 thereto. Upon completing step 1608, the process 1600 ends or other processing is performed.

Figure 17:
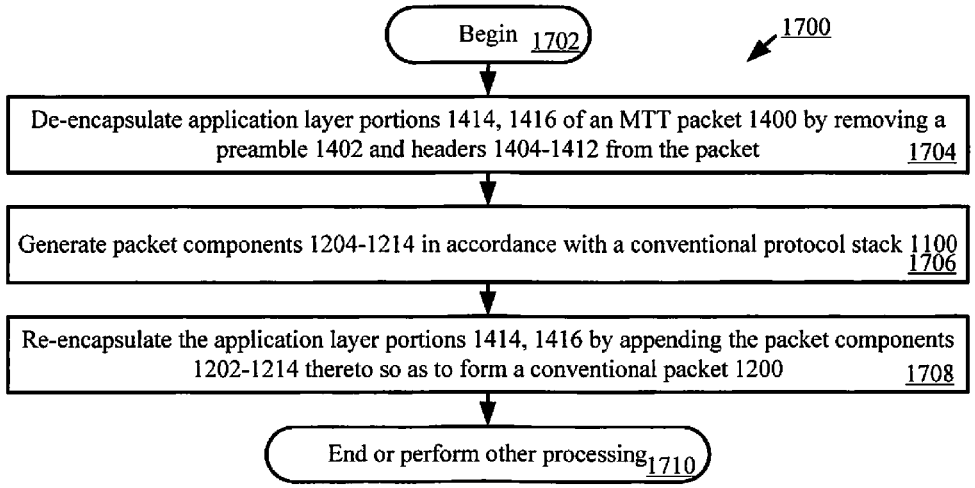

As shown in FIG. 17, an exemplary process 1700 begins at step 1702 and continues with step 1704. In step 1704, the application layer portions 1414, 1416 of an MTT packet 1400 are de-encapsulated by removing the preamble 1402 and headers 1404-1412 from the packet 1400. Next in step 1706, the packet components 1204-1214 are generated in accordance with the protocols of the conventional protocol stack 1200. In a next step 1708, the application layer portions 1414, 1416 are re-encapsulated by appending the preamble 1202 and headers 1204-1214 thereto so as to form a conventional packet 1200.

Figure 18:
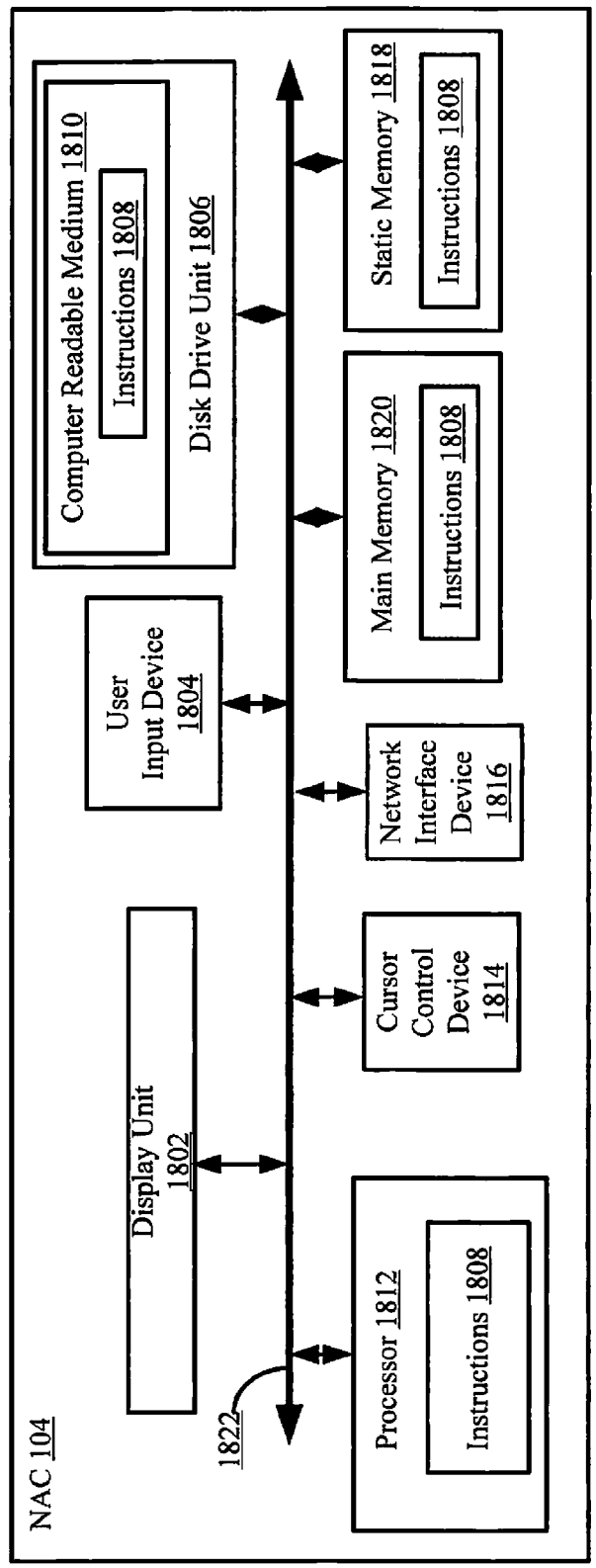
FIG. 18 is a block diagram of a computer architecture that can be used to implement a Network Administration Computer ("NAC") shown in FIG. 1.

Referring now to FIG. 18, there is shown an exemplary NAC 104 in accordance with the inventive arrangements. The NAC 104 can comprise various types of computing systems and devices, including a server computer, a client user computer, a Personal Computer ("PC"), a tablet PC, a laptop computer, a desktop computer, a control system or any other device capable of executing a set of instructions (sequential or otherwise) that specifies actions to be taken by that device. Further, while a single computer is illustrated in FIG. 18, the phrase "NAC" shall be understood to include any collection of computing devices that individually or jointly execute a set (or multiple sets) of instructions to perform any one or more of the methodologies discussed herein.

Referring now to FIG. 18, the NAC 104 includes a processor 1812 (such as a CPU), a disk drive unit 1806, a main memory 1820 and a static memory 1818, which communicate with each other via a bus 1822. The NAC 104 can further include a display unit 1802, such as a video display (e.g., an LCD), a flat panel, a solid state display, or a Cathode Ray Tube ("CRT"). The NAC 104 can include a user input device 1804 (e.g., a keyboard), a cursor control device 1814 (e.g., a mouse) and a network interface device 1816.

The disk drive unit 1806 includes a computer-readable storage medium 1810 on which is stored one or more sets of instructions 1808 (e.g., software code) configured to implement one or more of the methodologies, procedures, or functions described herein. The instructions 1808 can also reside, completely or at least partially, within the main memory 1820, the static memory 1818, and/or within the processor 1812 during execution thereof. The main memory 1820 and the processor 1812 also can constitute machine-readable media.

Those skilled in the art will appreciate that the module architecture illustrated in FIGS. 10-17 and the NAC architecture in FIG. 18, each represent merely one possible example of a computing device that can be used respectively for performing the methods described herein. However, the invention is not limited in this regard and any other suitable computing device architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

While the computer-readable storage medium 1010, 1810 is shown in FIGS. 10 and 18 to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but is not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Communications with Computing Devices Connected to a Different Logical Network

Before describing further aspects of the inventive arrangements, it is useful to consider the operation of the switching components used in a dynamic network as described herein. Conventional switches connect multiple segments of a network together. The simplest devices that perform this function are called "hubs" and operate at the physical layer. Hubs do not perform any traffic management tasks on data packets but simply copy all data traffic entering at a port and broadcast it out all other ports. Layer 2 (or "network") switches operate up to the link layer and have the ability to inspect packets entering the switch and to direct each packet to the proper port based on the destination physical address of the link layer packet. Switches differ from hubs in that they can forward packets to their destination without broadcasting across every port. Multi-layer switches (e.g. layer 3 switches) can operate up to the network, transport, and/or application layers and are able to perform operations that require knowledge of higher layer protocols such as IP multicasting, IP security, firewalling, load balancing, secure sockets layer encryption/decryption, and the like. Switches that operate at higher layers can perform some or all of the functions of routers and bridges. Conversely, routers and bridges can also perform lower layer switching functions.

Switches forward packets to the next hop by associating each output port with a particular physical address. As mentioned above, switches operate primarily in the data link layer. Data link layer messages (i.e. data packets) are addressed to physical addresses that represent the "next hop" in the data packet's path. An example of a physical address is the Media Access Control (MAC) address for the network interface of the host machine. MAC addresses are resolved using a link layer protocol such as address resolution protocol (ARP) and this information is then stored in a table for quick reference, e.g. an ARP table. When a packet is received that is destined for a particular host, the switch looks up the destination MAC address on the ARP table, locates the port associated with that MAC address and forwards the packet. If the MAC address for the destination host is not listed in the ARP table, the switch can broadcast an ARP polling message on every output port. If the destination host is connected to the switch, it will answer with an acknowledgement and the switch will forward the packet to the host using the port that received the acknowledgement. The switch can also record the port and network address in the ARP table for future forwarding to that MAC address.

Multi-layer switches that operate in the network layer or above can use logical addresses, e.g. IP addresses, to forward packets to their destination. Although network layer functions and above are typically handled by routers, there is little functional difference between a conventional router and a layer 3 (or network layer) switch. In either case, the switch (or router) receives a data packet destined for a particular host that has a logical address (i.e. a network layer or protocol address). After receiving the packet, the network layer switch will compare the destination IP address of the packet to a routing table to determine both the logical and physical address of the next hop in the path to the destination host. The network layer switch then transmits the packet to the next hop. The primary difference between the packet received at a layer 3 switch as compared to a packet received by a layer 2 switch is that the destination address (e.g. MAC address) of the link layer packet received at the layer 3 switch is that of the switch itself. As explained above, a link layer packet is addressed to the next hop of the packet's path. The layer 3 switch (or router) that receives the packet is the next hop of that packet and is tasked with determining the next hop for the packet based on the network layer address (e.g. IP address) or other information contained in the packet. In contrast, a layer 2 switch that receives a packet reads the link layer destination address and forwards the packet to the next hop, but the layer 2 switch itself is not a destination.

A Moving Target Technology (MTT) switch (e.g. network layer 2 switches 108, 109, layer 3 switch 110, and bridge 115) are able to perform packet forwarding as described above for an MTT enabled network operating in accordance with a mission plan. An MTT switch is able to perform the native functionality of a switch, described above, and for MTT enabled traffic. In some embodiments, the MTT switch can also be arranged to automatically distinguish between MTT enabled traffic and conventional data traffic for purposes of determining how to properly perform such switching operations. The mission plan defines a set of transformations that are performed on identity parameters of the data traffic within an MTT enabled network and the locations where such transformations are performed within the network. As with the modules, MTT enabled switches can be loaded with one or more mission plans. Additionally, MTT switches can perform the functions of modules and transform the identity parameters of data packets in accordance with the mission plan.

Current switch technology forwards data by "locking" a particular physical address to a particular port on the switch in the ARP table, as described above. Consequently, conventional switches are unable to process MTT enabled traffic because the identity parameters would move in accordance with the mission plan. For example, the IP address of the source and/or destination host, MAC address of the source and/or destination host, or both may be dynamically modified prior to reaching the switch. MTT enabled switches have the ability to operate according to the mission plan and correctly forward switched data packets with moving identities. For example, when a packet arrives at an MTT switch, the identity parameters of the data packet are analyzed and the destination host is compared to a dynamic ARP table that is driven and modified by the mission plan. Note that the terms dynamic and static describe the use of dynamic or static identity parameters. Although both terms are used in describing conventional ARP tables, as used herein a "dynamic ARP table" is a table populated in accordance with an MTT mission plan and a "static ARP table" is a table populated using convention methods known in the art.

The dynamic ARP table is populated and/or modified by the mission plan. The mission plan has information concerning manipulation of identity parameters throughout the entire network and therefore can supply the switch with a fully populated ARP table for use in forwarding packets. This dynamic modification of the ARP table can occur in a number of ways. In certain embodiments, the values in the ARP table are populated by the mission plan when it is loaded into the switch. In such embodiments, the ARP table values are rewritten each time a new mission plan is activated. In other words, the values in the ARP table are changed to facilitate correct switching of packets using the identity parameters as currently manipulated for use in the network according to the mission plan. In other embodiments, the relationships between the values in the ARP table are updated by the mission plan. For example, the relationships between ports and the various device addresses can be updated by the mission plan. In each embodiment, the mission plan updates or modifies the ARP table so that the switch functions correctly with the manipulated identity parameters in use at that particular time. As described above, the manipulation of identity parameters can change based on a trigger event. The mission plan will define what changes occur in response to a particular type of trigger event. Therefore, each trigger event can cause a modification or update to a dynamic ARP table.

In one embodiment, a switch includes dedicated ports that service both a static and an MTT enabled network. In effect, the switch is split with static ports servicing a static network and MTT ports servicing a dynamic network. In such a scenario, each set of ports can have a separate ARP table or can share an ARP table that includes a static section and an MTT section. At least that portion of the ARP table servicing the MTT enabled ports is determined in accordance with a mission plan, and varies in response to predetermined trigger events defined by the mission plan. In another embodiment, the switch can identify MTT enabled traffic and transform the identity parameters of the data packets into static identity parameters, i.e. true identity parameters. After the identity parameters have been transformed, the switch can process the data packets using conventional switching algorithms using a conventional ARP table. The switch can thereafter forward the packets containing the true identity parameters, or can forward the packets with false identity parameters. The false identity parameters can be the same as those contained in the packet when received, or the switch can manipulate the identity parameters to include a different set of false identity parameters. The way the packets are processed in either case can be determined by a mission plan as described above.

In certain embodiments, both static and dynamic data traffic can be present in the network at the same time. Therefore, the capability to accommodate both static and dynamic traffic is important. For example, data can be either static or dynamic based on the value or importance of the data. A host computer operating in accordance with a particular mission plan can enable MTT for data transmitted with a particular application or to a particular server. In contrast, web browsing data or other low priority data can be sent without enabling MTT. Therefore, all network equipment, including switches, can simultaneously accommodate both static and dynamic traffic and is fully capable of handling transformations and forwarding of MTT enabled packets in addition to forwarding of static packets through the same network.

In certain embodiments, the switch can be connected to multiple networks operating different mission plans. Alternatively, one or more of the networks connected to the switch can be static, i.e. not MTT enabled. In these situations, the switch can act like a bridge and be able to translate between networks operating different mission plans or between an MTT network and a static network. Switches operating between these network boundaries can have an ARP table for each network, or have an ARP table with multiple sections where each section corresponds to a different network. In either scenario, the ARP table can be dynamically populated in accordance with a mission plan.

In addition to forwarding MTT enabled data packets in accordance with a mission plan, MTT switches are also able to manipulate switching behavior based on the mission plan by pseudorandomly alternating the output port that is used for communicating packets to a particular destination. For example, a switch can have one port that leads to a router connected to another network in the same enterprise wide area network. The switch can have a second port that leads to a gateway into the Internet. Both paths can lead to the same destination and the switch can pseudorandomly alternate between the paths when communicating packets to the same ultimate destination. Alternatively, or in addition thereto, the switch can broadcast extraneous packets on some or all ports to create noise within the network. The extraneous packets can contain useless bits of random data or encrypted data to confuse and harass individuals and systems trying to infiltrate the network. The MTT switch can alternate between these behaviors or any combination thereof in accordance with one or more mission plans.

Optionally, the switch can further apply a set of filtering rules to function as a firewall. In certain embodiments, the switch can identify MTT enabled traffic based on a mission plan and filters out all other traffic. In other embodiments, the switch can detect anomalies in the data traffic. The filtering rules can be designed so that the switch directs non-MTT enabled and/or anomalous packets to a "honeypot" server that can mimic the behavior of network systems to lure attack traffic. By filtering non-MTT enabled and/or anomalous packets to the honeypot, especially those associated with attack traffic, a network administrator is able to prevent an attack, analyze network vulnerabilities, and/or develop new techniques for countering attacks based on the behavior of the disallowed traffic. Alternatively, the non-MTT enabled packets can be discarded out right, or filtered using conventional firewalling techniques.

Dynamic Session Hopping

Referring once again to FIG. 1, a node that is participating in a maneuvering network communication session (e.g. node 101, 102 or 103) can also communicate with nodes that are not participating in the maneuvering session. For example it may be desirable for node 101 to communicate with node 136 which is a static node. In such a scenario, a virtual identity is selected for the node 101 for use during the communication session with the static node 136. In FIG. 1, the second network is shown as being directly connected to computer network 100, but is should be understood that the two networks could be connected through a third network. For example, the second network 124 could be connected to network 100 through an unsecured internet connection.

The selected virtual identity for node 101 is comprised of a unique set of identity parameters (hereinafter referred to as session identity parameters) which are used by the participating node during the static communication session with the non-participating node. One or more of the session identity parameters comprising the virtual identity for the participating node (e.g. node 101) will be different from the true identity parameters for such node. In other words, one or more of the session identity parameters will actually be false identity parameters. However, these session identity parameters will remain fixed for the duration of a communication session with non-participating node (e.g. node 136). Accordingly, in a dynamic network in which identity parameters for nodes are regularly changing over time in accordance with a mission plan, the session identity parameters will remain fixed, at least for the duration of a static communication session with a static node. In other words, the variation of the session identity parameters is decoupled from the normal time based coordinated variation of identity parameters as specified by the mission plan for the overall network. Additional static communication sessions can be established with other nodes in second network 124. For example, node 101 can have a static communication session with node 138 concurrently with the communication session established with node 136. A different virtual identity is advantageously selected for each static communication session.

A goal of using the virtual identity is to present a static set of identity parameters to the non-participating or static node 136 during a static communication session. The static set of identity parameters allow a dynamic node that is participating in an MTT network to also communicate with static nodes that are not participating in the MTT network. Accordingly, any packets from the participating node (e.g. node 101) that are communicated to the non-participating node (e.g. static node 136) for the duration of the communication session will advantageously utilize the same virtual identity (i.e., the same selected set of session identity parameters) for purposes of referring to the participating node.

The foregoing concept will now be described in relation to FIG. 1 which shows an IDP set 138 comprising the virtual identity for participating node 101. IDP set 138 is transmitted by switch 115 as part of a data packet (not shown) which is in the process of being communicated from node 101 to node 136. The IDP set 138 will contain the session identity parameters for node 101 as described herein. Similarly, node 136 will use the session identity parameters associated with assigned virtual identity for node 101 to communicate with that node. This IDP set 138 will remain constant for the duration of a communication session. Accordingly, the virtual identity of the node 101 is invariant when represented to the node 136 during the static communication session.

The virtual identity of the node 101 can be determined or specified at least partially based on information contained in the mission plan 604. For example, the mission plan may specify a plurality of acceptable identity parameter values that can be used as session identity parameters for constructing a virtual identity. These session identity parameters can be assigned on the basis of a suitable selection process I (e.g. a pseudo-random selection process). Alternatively, the session identity parameters can be generated using a pseudo-random value generator with appropriate constraints applied thereto so as to prevent communication conflicts.

The identity parameters for outgoing packets directed to a static node must at some point within the network be converted to the session identity parameters associated with the selected virtual identity. This conversion can take place locally at a module which is adjacent or local to the node which originated the packet. For example, in the case of node 101, the conversion of identity parameters to static session identity parameters can occur at module 105. In alternative scenarios, the conversion can take place elsewhere. For example, in some scenarios the transformation of identity parameters to the static session identity parameters can occur at the edge of the network (e.g., at bridge 115).

When the translation of the identity parameters occurs at a module local to a node which originates a packet, then the virtual identity for a participating node (e.g. node 101, 102, 103) is used both internally and externally of the dynamic network when engaged in a static communication session. In order to understand this concept, it is useful to refer to FIG. 1. Consider a scenario in which a packet is communicated from node 101 (a participating node) and is addressed to non-participating (static) node 136. In such a scenario, module 105 will receive the packet from node 101 and examine its contents to determine if the source identity parameters are valid. Since the packet originated from node 101, its identity parameters will be deemed valid in and the process will continue.

The module 105 will determine the false identity parameters which are to be used for this particular data packet transmitted from node 101. This process can involve examining the identity parameters for the destination mode. In this scenario, the destination node will be the non-participating static destination node (e.g. node 136). The module 105 will thus recognize that the destination address is a valid address for a node that is not a participant in the dynamic network 100. Since the communication is directed to a non-participating node 136, the false identity parameters chosen by module 105 for representing node 101 will be session identity parameters. These session identity parameters will define a specific virtual identity for node 101 that is selected by module 105 for this static communication session.

After the identity parameters for node 101 have been transformed to session identity parameters, the packet is forwarded to the next node along its path (e.g. switch 108). The network components (modules, switches, bridges) will recognize that the session identity parameters included within the packet as a source address represent a valid virtual identity for node 101. Accordingly, these network components will accept the packet for switching, routing and processing. The switches 108, 110 will also recognize that the destination address for the transmitted packet is a non-participating node (i.e. node 136) and will ultimately forward the packet to bridge 115. Accordingly, these intervening network components will become aware that node 101 has initiated a static communication session with a non-participating node having a particular static address. Ultimately the packet will be routed to node 136, which is a non-participant in the dynamic network 100.

When the non-participating node (e.g. node 136) transmits a packet to the participating node (e.g. node 101), it will use as the destination address the session identity parameters associated with participating node. Bridge 115, switches 108, 110 and modules 105, 113 will recognize the destination address as a valid virtual identity which is permitted for node 101. They will also recognize the identity parameters of non-participating node 136 as belonging to a node for which a communication was initiated by node 101. Such recognition is based on the fact that node 101 previously initiated a static communication session with the non-participating static node 136. Accordingly, bridges, switches, modules will be aware that the particular static communication session has been initiated by node 101. Having established the validity of the data packets on this basis, bridges, switches and modules within the network will accept the incoming data packets from node 136 and route the transmitted packet to participating node 101.

Notably, the network 100 can recognize the session identity parameters for node 101 as a valid virtual identity for that node while concurrently also routing MTT traffic to the same node using a different (dynamic) address which is varied in accordance with the mission plan. Accordingly, a participating node such as node 101 can continue to participate in the dynamic network communications while also communicating with a non-participating node (node 136) using a static address.

In certain scenarios, it may be desirable for the virtual identity for a participating node (e.g. node 101) to be applied at locations other than at an adjacent or local module (e.g. module 105 in the example above). For example, in some instances, it may be desirable for the virtual identity to be applied only at the edge of a dynamic network (e.g., at bridge 115). Consequently, the set of false identity parameters used to represent the participating node when the packet is transiting internal of the network will vary in coordination with the network as a whole, as specified by the mission plan. In other words, the packet will be treated as a conventional MTT packet within the network. However, when the packet reaches the edge of the dynamic network (e.g. switch 110 or bridge 115) the identity parameters used to reference the source node from which the packet originated (e.g. node 101) will be transformed to a selected set of session identity parameters which establish a static virtual identity. After such transformation, the packet is communicated to the non-participating node (e.g. node 136). Accordingly, the participating node 101 will appear to have a static set of identity parameters.

Conversely, when the non-participating node (e.g. node 136) transmits a packet to the participating (e.g. node 101), the destination address will be specified in accordance with the virtual identity which has been assigned to the participating node. This same destination address can be used for the duration of the static communication session. When such packets are received at the edge of the dynamic MTT network (e.g. at bridge 115 or switch 110), the destination address will be recognized as a valid virtual identity associated with the participating node (e.g. node 101). At this point, the session identity parameters associated with the selected virtual identity will be transformed into the current set of false identity parameters which are in use at that time for the particular participating node (e.g. node 101) within the network. These false identity parameters will be specified by the mission plan for the participating node. Once the session identity parameters have been transformed in this way, the packet from the non-participating node can be transmitted within the network (e.g. within first logical network 130) in the usual way described herein with respect to a dynamic MTT network. The identity parameters for the non-participating node can remain unchanged as the packet is transmitted from the non-participating node (e.g., node 136) to the participating node (e.g., node 101) within the dynamic network.

Dynamic Session Hopping Using Virtual Identities

The imposition of a static virtual identity for a dynamic node which is otherwise participating in a maneuvering network facilitates communications with static nodes which are non-participants in such a network. However, the adoption of a static identity also carries some security risks as it presents a static target upon which adversaries can mount an attack. In order to address this risk. Accordingly, the virtual identity of a participating node can be modified when necessary to address potential threats. The virtual identity will not vary in accordance with the normal coordinated variation of identity parameters (as specified by the mission plan) for the network as a whole. Instead, the virtual identity will remain static except when potential threats are discerned with respect to such static communication session. When the occurrence of such potential threats is detected, a first virtual identity can be selectively modified or changed to a second virtual identity which is different as compared to the first virtual identity. This modification will generally involve a change in one or more of the identity parameters that are specified for the virtual identity.

Information concerning potential security threats with respect to the static communication session can be discerned by monitoring communications within the computer network. This information concerning network communications can be analyzed using threat identification algorithms, or by other means. Such monitoring can be performed by one or more modules 105-107, 113, 114, by processing elements associated with switches 108, 109, 110, by bridge 115 or by NAC 104. However, in a preferred embodiment, such monitoring can be performed by a network component which is responsible for transforming the identity parameters for a participating node to the session identity parameters.

In the first exemplary embodiment outlined above, the transformation to a particular set of session identity parameters would usually be handled by a local module through which the participating node connects to the dynamic computer network. That same module could then be used to perform the monitoring function described herein. For example, in the case of node 101, the module 105 could perform such monitoring, and would analyze network traffic for potential threats. When justified by the threats, the module would select and begin using a new virtual identity for the participating node in accordance with certain rules established by the mission plan. These rules would ensure that the selected virtual identity (and the associated session identity parameters) are accepted as valid by the other modules and switches within the network. For example, the mission plan can specify one or more permissible sets of session identity parameters which can be used when selecting a virtual identity for each one of the nodes 101-103.

In the second exemplary embodiment outlined above, the transformation to a particular set of session identity parameters would usually be handled by a hardware entity such as switch 110 or bridge 115 which also performs module functions. However, a module 113, 114 could also be used for this purpose. It is convenient for the same hardware entity that is responsible for initiating a transformation to the session identity parameters to also be responsible for monitoring and analyzing threat traffic. However, the invention is not limited in this regard. Regardless, when analysis indicates a sufficient threat, a new virtual identity is selected for referencing the participating node in communications to non-participating nodes. Thereafter identity parameters for a participating node associated with a particular static communication session would be transformed by such hardware entity using a new set of session identity parameters associated with the new virtual identity.

Figure 19A:
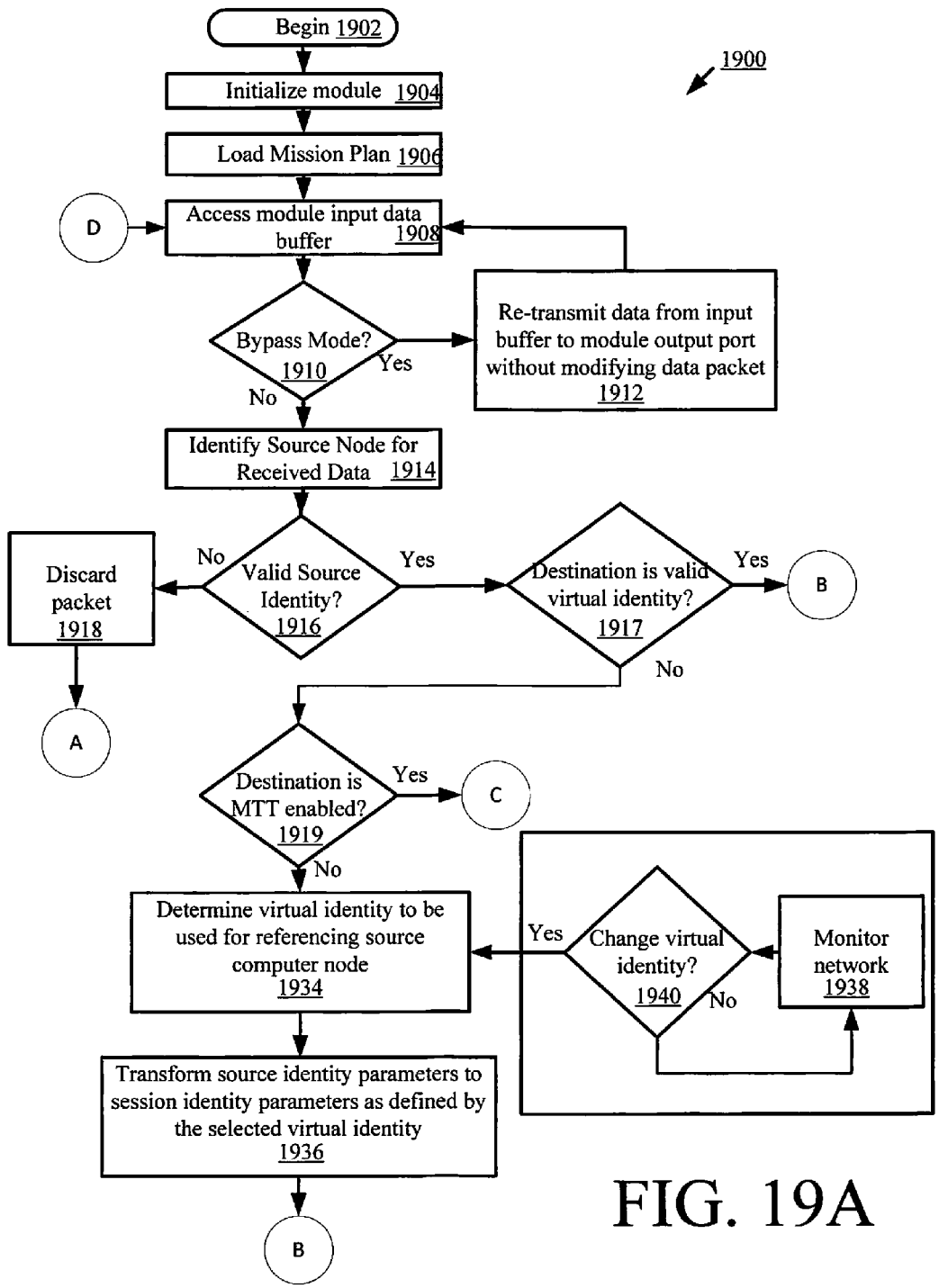
FIG. 19A-19B is a flowchart that is useful for understanding an operation of a module in an alternative embodiment of the invention.

Referring now to FIG. 19A, a flowchart is provided which shows how an exemplary module can process data packets for implementing a static communication session as described herein. Steps 1902-1912 are similar to steps 802-812 in FIG. 8 and therefore do not require further explanation. Beginning with step 1916, we shall first consider a scenario in which the received packet is generated by a participating node within the MTT network 100 (e.g., node 101, 102, 103). In step 1916 a determination is made as to whether identity parameters of the source node specified by the packet are valid. If the source identity parameters are not valid (1916: No), then the packet will be rejected in step 1918. However, a packet originating from a dynamic node (e.g. node 101, 102, 103) will always have a valid source identity when it is initially transmitted from the node (i.e. before any transformation of identity parameters). Similarly, a packet that contains a correctly manipulated set of false identity parameters (e.g., as specified by a mission plan for a particular source node) will also be deemed to have a valid source identity. If the source identity is valid (1916: Yes), the process will continue on to step 1917. At 1917 a determination is made as to whether the specified destination address for the packet is a valid virtual identity. This step will be discussed below in further detail. Assuming that the packet destination does not specify a valid virtual identity, the process continues on to step 1919.

Figure 19B:
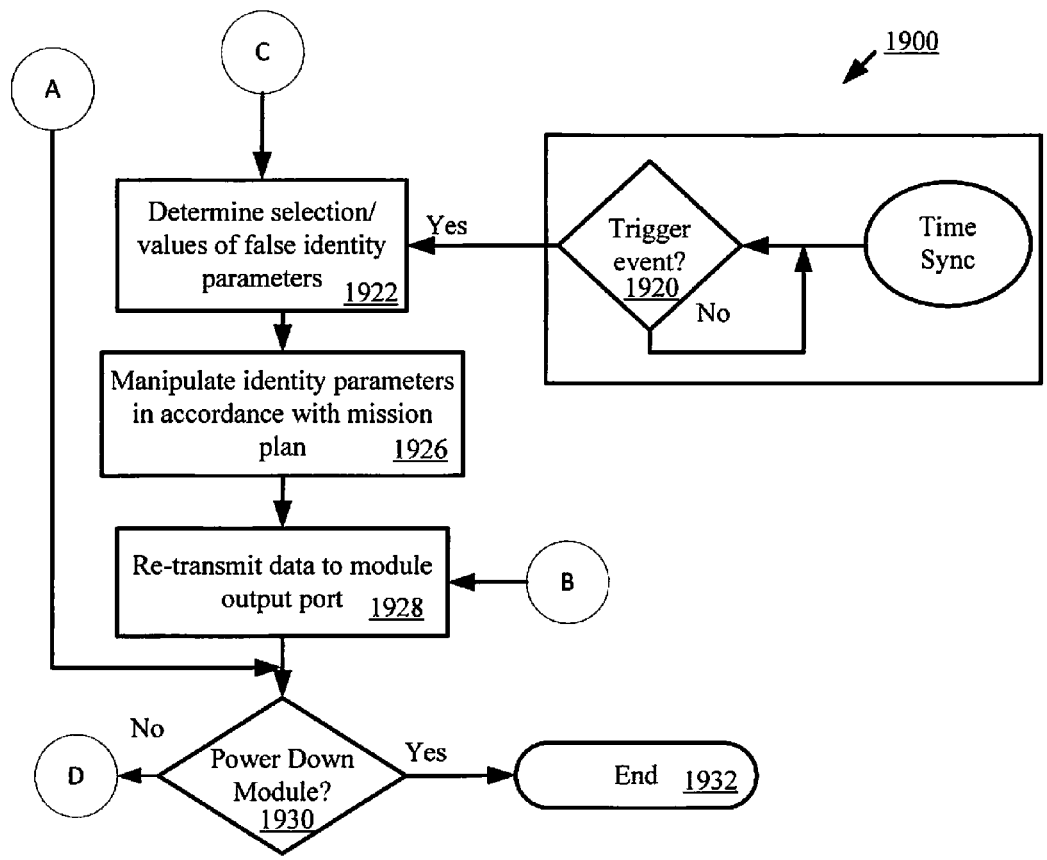

In step 1919 a determination is made as to whether the destination node is a dynamic node which is part of the MTT enabled network 100. If so (1919: Yes) then the process continues on to step 1922 for normal MTT processing as previously described relative to FIG. 8. Accordingly, the process will continue with steps 1920-1928 in which identity parameters are manipulated in accordance with a mission plan. Steps 1922-1932 shown in FIG. 19B are similar to corresponding steps 802-832 and therefore will not be described here in detail.

In some instances a node (101, 102, 103) within the network 100 will transmit a data packet to a destination node which is a non-participating (static) node. For example, this can occur when a source node is initiating a static communication session with a non-participating node (e.g., node 136). Referring once again to step 1919, the destination node in such a scenario will be found not to be an MTT enabled node (1919: No). Accordingly, the process will continue on to step 1934.

In step 1934 a virtual identity will be selected for the source computer node. If this is the first data packet communicated to the static node, this step will involve choosing one of the permitted virtual identities that are available or allowed for the source MTT node. However, if it is determined that the communication is a second or subsequent communication to the same static non-participating node, then the selected virtual identity will normally be the same as was previously used when communicating with the particular non-participating node. In step 1936 the identity parameters of the source computer node will be transformed to the session identity parameters as specified by the selected virtual identity. Thereafter, the process will continue to step 1928 and the packet will be re-transmitted so it can continue toward its destination.

In each data communication from the source computer node to the non-participating static destination node, one or more identity parameters of the source node will be transformed to the session identity parameters. In general, one or more of these session identity parameters will falsely specify an identity parameter for the source node, thus allowing a virtual identity to be established for purposes of the communication session. The transformation described herein will generally be performed at one of the modules within the dynamic network. For example, modules 105-107, 113, or 114 could be used for this transformation. Alternatively, the transformation can be performed by processing elements associated with switches 108, 109, 110, or by bridge 115. In some embodiments, the transformation can occur at the source node. When data packets are received at the dynamic network from a non-participating static node, the transformation process described herein can be reversed by one of these same components. In other words, the session identity parameters in the received data communication from the non-participating node will be transformed to the identity parameters of the source computer node in the dynamic network.

As noted above, one or more session identity parameters will generally be false values which falsely specify identity parameter information about a particular node. These false values are used to establish a virtual identity. But consider the case where a data message is communicated from a source computer node in the dynamic network. Prior to the time that an identity parameter is converted to a session identity parameter, the particular message can contain identity parameters that are true values insofar as they correctly specify the true identity of the particular source node. However, the invention is not limited in this regard and in some scenarios it may be advantageous to specify such identity parameters using false values which vary in accordance with a dynamic network protocol. Accordingly, before identity parameters are transformed to session identity parameters, they can travel through a portion of the dynamic network using false identity parameters that dynamically vary in accordance with a mission plan. As such, one or more transformations of identity parameters can take place as the data message transits through the network.

Conversely, when a message containing session identity parameters is received from a non-participating node, the session identity parameters can at some point be transformed within the network. They can be transformed to the true or correct identity parameters associated with a particular network node for transport within the network. But as an alternative, they can be transformed to specify false identity parameter values which vary in accordance with a dynamic network protocol specified by a mission plan. Ultimately, the identity parameters can be transformed to true or correct identity parameter when the data is processed by the receiving node participating in the dynamic network. Accordingly, one or more transformations of identity parameters can take place as the data message transits through the network.

The concept of distance vectors has been previously described herein. This concept can be applied to the transformation of one or more identity parameters to the session identity parameters. The particular location or module within the dynamic network where the identity parameter transformations are performed can be selectively varied. For example, the transformation location can be varied in accordance with a pseudorandom algorithm as specified by a mission plan. Such an arrangement permits a distance vector to be varied for a node within the network when it is communicating with a static or non-participating node outside the network. The node within the network will have a static virtual identity specified by the session identity parameters, but within the network the location of the transformation of identity parameters to the session identity parameters will vary in accordance with the mission plan. Accordingly, a distance vector between the source node and the non-participating static node can be dynamically varied. A similar technique can be employed for transforming session identity parameters in data messages received by the network from non-participating nodes.

Concurrently with the other operations described in relation to FIG. 19A, network communications are monitored in step 1938 for potential threats which may affect the static communication session. In step 1940 a determination will be made based on such monitoring as to whether a virtual identity that is currently in use should be changed as described above. If so, then a new virtual identity will be selected in step 1934 for subsequent communications with a static node as described herein.

In the process described herein, the module essentially discontinues use of addresses that are the active target of attack. This act helps protect data associated with dynamic MTT enabled node participating in a static communication session. By discontinuing use of an address that is the target of an attack, subsequently transmitted information from such node will be streamed using source address identity parameters that are not under scrutiny from the attacker. Any traffic that continues to arrive at network 100 destined for the address which is no longer active can be redirected by the module to an analyzer or honey pot. The approach described herein thus allows for the module or other point of identity parameter manipulation to change the parameters of an active static communication session to mitigate a threat. If the threat appears to have subsided, or has been mitigated the module can choose to utilize an address that was previously terminated. For example, such address might be used for purposes of communication with a different static endpoint node.

Other defensive actions can also be taken with respect to a particular static communication session in response to detected threats. For example, the module can be configured to modify one or more parameters of the static communication session. Such parameters can include timeout values, number of allowed connections and so on. This allows the module to avoid and/or limit initiating new communications over channel(s) where a threat has been detected.

After a static communication session has been established, a non-participating node will in many cases communicate packets to the MTT enabled node (e.g. node 101, 102, or 103) in the network that initiated the session. When such packets are received and evaluated at step 1916 they will be found to have a source identity which is external to the MTT enabled network 100. The packets will also be found to have identity parameters which do not vary according to the mission plan. However, as part of the source validity determination process in step 1916, a further aspect of the packet will be considered. In particular, the source identity parameters for the received packet will be compared to identity parameters of non-participating static nodes with which a current static communication session has been previously initiated as described herein. If the source identity parameters correspond to an external node engaged in a previously initiated static communication session, then the packet will be deemed to have a valid source identity (1916: Yes) and the process will continue on to 1917. At 1917 a further check will be made to determine whether the packet has a valid virtual identity corresponding to a permitted set of session identity parameters. If so, then the process will continue to step 1928 at which point the data packet will be re-transmitted towards its destination at the module output port.

A particular static communication session ends when the virtual identity for a dynamic node participating in such session is changed. Communications with the static node can continue while using the new virtual identity. More particularly, a second static communication session can be initiated with the second node. The change in virtual identity may create some disruption. For example, the participating node may not be recognized from the earlier static communication session. Also, any connections between the two nodes may have to be re-established.

Notably, the adaptive modification of the virtual identity of a participating node 101, 102, 103 as described herein can be performed asynchronously relative to the coordinated variation of identity parameters within the dynamic computer network 100. Accordingly, the variation in virtual identity for a particular participating node will occur independently relative to the coordinated variation of the maneuvering network as a whole. Both types of network maneuvering can be controlled by a mission plan 604.

During such times that a participating node 101, 102, 103 is communicating with a static node (e.g. node 136), the participating node may also engage in communications with other participating nodes in the dynamic network. Accordingly, node 101 may be actively engaged in a static communication session with node 136, while also participating in a dynamic communication session with other nodes (e.g., server 111) within the computer network 100. In such a scenario, the participating node will participate in the static communication session using a selected virtual identity, and will participate in a dynamic communication session using one or more of the identity parameters which change in accordance with the coordinated variation defined by the mission plan. The coordinated variation of identity parameters as described herein will involve dynamic modification of identity parameters for the various nodes in the maneuvering network as explained above. For example, this coordinated variation will frequently be performed on a timed basis (e.g., every 30 seconds). This dynamic modification can include dynamically modifying the identity parameters which are used for the node involved in the static communication session. Concurrently, the virtual identity of the node involved in the static communication session is maintained substantially invariant for purposes of communicating with the static or non-participating node, except when a specific threat condition is detected which requires modification.

Types of IDPs that can be Varied

Referring now to FIG. 20, there is provided a list of some of the identity parameters (IDPs) that can be manipulated by the modules 105-107, 113, 114 and/or by bridge 115. Each of the parameters listed in FIG. 20 is included in a data communication included in a network using a TCP/IP communication protocol. Most of the information types listed in FIG. 20 are well known to those skilled in the art. However, a brief description of each type of information and its use as an IDP is provided herein. Also provided is a brief discussion of the ways in which each IDP can be manipulated.

IP Address. An IP Address is a numerical identifier assigned to each computing device participating in a computer network where the network uses the well-known Internet Protocol for communication. The IP address can be a thirty two bit or one hundred twenty eight bit number. For purposes of the present invention, the IP address number can be changed to a false value that is selected randomly (e.g., using a pseudorandom number generator). Alternatively, the false IP address value can be randomly selected from a predetermined list of false values (e.g., a list specified by a mission plan). The source and destination IP addresses are included in header portion of a data packet. Accordingly, manipulation of these values is performed by simply changing by using packet manipulation techniques which change the IP header information. When the packet arrives at a second module (the location of which can be manipulated), the false IP address values are transformed back to their true values. The second module uses the same pseudorandom process (or its inverse) to derive the true IP address value based on the false value.

MAC Address. A MAC address is a unique value assigned to a network interface device by a manufacturer and stored in an onboard ROM. For purposes of the present invention, the source and/or destination MAC address can be changed to a false value that is selected randomly (e.g., using a pseudorandom number generator). Alternatively, the false MAC value can be randomly selected from a predetermined list of false values (e.g., a list specified by a mission plan). The source and destination MAC addresses are included in header portion of data packet. Accordingly, manipulation of these values is performed by simply changing an Ethernet header information of each packet. When the packet arrives at a second module (the location of which can be manipulated), the false MAC address values are transformed back to their true values. A module receiving a packet will use the same pseudorandom process (or its inverse) to derive the true MAC address value based on the false value.

Network/Subnet. In some embodiments, the IP address can be thought of as a single IDP. However, an IP address is generally defined as including at least two parts which include a network prefix portion and a host number portion. The network prefix portion identifies a network to which a data packet is to be communicated. The host number identifies the particular node within a Local Area Network ("LAN"). A sub-network (sometimes referred to as a subnet) is a logical portion of an IP network. Where a network is divided into two or more sub-networks, a portion of the host number section of the IP address is used to specify a subnet number. For purposes of the present invention, the network prefix, the subnet number and the host number can each be considered to be a separate IDP. Accordingly, each of these IDPs can be separately manipulated independently of the others in a pseudorandom way. Moreover, it will be appreciated that a data packet will include a source IP address and a destination IP address. Accordingly, the network prefix, the subnet number and host number can be manipulated in the source IP address and/or the destination IP address, for a total of six different variable IDPs that can be manipulated in a pseudorandom way. A module receiving a packet will use the same pseudorandom process as an originating node (or the inverse of such process) to derive the true Network/subnet information value based on the false value.

TCP Sequence. Two client computers communicating with each other on opposite sides of a TCP session will each maintain a TCP sequence number. The sequence number allows each computer to track how much data it has communicated. The TCP sequence number is included in the TCP header portion of each packet which is communicated during the session. At the initiation of a TCP session, the initial sequence number value is randomly selected. For purposes of the present invention, the TCP sequence number can be manipulated as an IDP in accordance with a pseudorandom process. For example, the TCP sequence number can be changed to a false value that is selected randomly (e.g., using a pseudorandom number generator). When the packet is received at a different module of the network (the location of which will be dynamically varied), the TCP sequence number can be transformed from a false value back to a true value, using an inverse of the pseudorandom process.

Port Number. A TCP/IP port number is included in the TCP or UDP header portion of a data packet. Ports as used in the TCP/IP communication protocol are well known in the art and therefore will not be described herein in detail. The port information is contained within the TCP header portion of the data packet. Accordingly, manipulation of the port information is accomplished by simply modifying the TCP header information to change a true port value to a false port value. As with the other IDPs discussed here, the port number information can be manipulated or transformed to a false value in accordance with a pseudorandom process at a first module. The port information can later be transformed from a false value to a true value at a second module, using an inverse of the pseudorandom process.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for communicating in a computer network, comprising:

maneuvering the computer network in accordance with a mission plan which specifies a coordinated variation of assigned values for one or more identity parameters which are respectively specified for referencing each of a plurality of nodes when communicating among the nodes within the computer network;

initiating a communication from a first node of the plurality of nodes participating in the coordinated variation to a second node which is not participating in the coordinated variation;

selecting for the first node a first virtual identity comprising one or more session identity parameters to be used for the first node during a static communication session with the second node, where the static communication session comprises identity parameters having fixed values;

in each data communication from the first node to the second node, transforming at least one identity parameter of the first node to the session identity parameter for the first node when the data communication reaches an edge of the computer network in which said maneuvering is being performed;

detecting a communication security threat affecting the static communication session;

adaptively modifying the first virtual identity of the first node to obtain a second virtual identity for the first node in response to the detection of the communication security threat, where the first virtual identity is changed independently of changes to identity parameters which are specified for respectively referencing nodes when communicating there amongst via dynamic communication sessions;

continuing the first node's communications with the second node using the second virtual identity; and excluding the session identity parameters from the coordinated variation during the static communication session.

2. The method according to claim 1, further comprising dynamically varying a location in the computer network where said transforming is performed to vary a distance vector between the first node and the second node.

3. The method according to claim 1, further comprising determining the first virtual identity of the first node at least partially based on information specified by the mission plan.

4. The method according to claim 1, wherein concurrent with the static communication session, the first node communicates with at least one of the plurality of nodes in the computer network in a dynamic communication session in which communications are performed using one or more of the identity parameters which change in accordance with the coordinated variation defined by the mission plan.

5. The method according to claim 4, wherein the coordinated variation results in a dynamic modification of the one or more identity parameters of the first node while the first virtual identity of the first node is maintained invariant.

6. The method according to claim 1, further comprising:
terminating the static communication session; and
performing subsequent communications between the first node and the second node in a second static communication session using the second virtual identity for the first node, wherein the second virtual identity includes the at least one session identity parameter which has been changed.

7. The method according to claim 1, wherein the adaptively modifying step is performed asynchronously of the coordinated variation.

8. The method according to claim 1, further comprising establishing a plurality of connections between the first node and the second node as part of the static communication session.

9. The method according to claim 7, further comprising using the same virtual identity for each of the plurality of connections.

10. The method according to claim 1, wherein the first virtual identity of the first node is selected to have a set of identity parameters which conform to the identity parameters values specified for the first node by the coordinated variation at a time when the static communication session is first established.

11. The method according to claim 1, further comprising:
initiating a communication from the first node to a third node which is not participating in the coordinated variation;
selecting for the first node a third virtual identity comprising one or more second session identity parameters to be used for referencing the first node during a static communication session with the third node; and
excluding the second session identity parameters from the coordinated variation during the static communication session with the third node.

12. The method according to claim 11, continuing the static communication session with the second node concurrently with the second static communication session with the third node.

13. A computer system, comprising:
a computer network which maneuvers in accordance with a mission plan that specifies a coordinated variation of assigned values for one or more identity parameters which are respectively used for referencing each of a plurality of nodes comprising the computer network when communicating among the nodes;
at least a first node of the plurality of nodes participating in the coordinated variation and configured to initiate a communication with a second node which is not participating in the coordinated variation of identity parameters;
at least one computer processing device configured to
perform the coordinated variation of assigned values,
select for the first node a first virtual identity comprising one or more session identity parameters to be used for referencing the first node during a static communication session with the second node, where the static communication session comprises identity parameters having fixed values,
in a data communication from the first node to the second node, transform at least one identity parameter of the first node to the session identity parameter for the first node when the data communication reaches an edge of the computer network in which said maneuvering is being performed,
detect a communication security threat affecting the static communication session,
adaptively modify the first virtual identify of the first node to obtain a second virtual identity for the first node in response to the detection of the communication security threat, where the first virtual identity is changed independently of changes to identity parameters which are specified for respectively referencing nodes when communicating there amongst via dynamic communication sessions,
continue the first node's communications with the second node using the second virtual identity, and
exclude the session identity parameters from the coordinated variation during the static communication session.

14. The computer system according to claim 13, wherein the at least one computer processing device includes a plurality of computer processing devices and wherein a location in the computer network where said transforming is performed is selectively varied among said plurality of computer processing devices to vary a distance vector between the first node and the second node.

15. The computer system according to claim 13, wherein the computer processing device is configured to select the virtual identity at least partially based on information specified by the mission plan.

16. The computer system according to claim 13, wherein the at least one computer processing device is configured to facilitate communications between the first node and at least one of the plurality of nodes in the computer system in a dynamic communication session concurrent with the static communication session, wherein the dynamic communication session is performed using one or more of the identity parameters which change in accordance with the coordinated variation defined by the mission plan.

17. The computer system according to claim 16, wherein the coordinated variation results in a dynamic modification of the one or more identity parameters assigned to the first node while the first virtual identity of the first node is maintained invariant.

18. The computer system according to claim 13, wherein the at least one computer processing device is configured to perform the adaptive modifying asynchronously of the coordinated variation.

19. The computer system according to claim 15, wherein the at least one computer processing device is configured to facilitate establishment of a plurality of connections between the first node and the second node as part of the static communication session by using the same virtual identity for the first node for the plurality of connections.

20. The computer system according to claim 13, wherein the first virtual identity of the first node is invariant when represented to the second node during the static communication session.

\* \* \* \* \*